US009135074B2

(12) United States Patent
Cherkasova et al.

(10) Patent No.: US 9,135,074 B2
(45) Date of Patent: Sep. 15, 2015

(54) EVALUATING PERFORMANCE OF WORKLOAD MANAGER BASED ON QOS TO REPRESENTATIVE WORKLOAD AND USAGE EFFICIENCY OF SHARED RESOURCE FOR PLURALITY OF MINCPU AND MAXCPU ALLOCATION VALUES

(75) Inventors: Ludmila Cherkasova, Fort Collins, CO (US); Jerome Rolia, Fort Collins, CO (US); Clifford A. McCarthy, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1794 days.

(21) Appl. No.: 11/489,968

(22) Filed: Jul. 20, 2006

(65) Prior Publication Data

US 2008/0022282 A1 Jan. 24, 2008

(51) Int. Cl.
G06F 9/46 (2006.01)
G06F 9/50 (2006.01)
G06F 11/34 (2006.01)

(52) U.S. Cl.
CPC ............ *G06F 9/505* (2013.01); *G06F 11/3461* (2013.01); *G06F 9/5044* (2013.01); *G06F 11/3495* (2013.01); *G06F 2209/508* (2013.01); *G06F 2209/5022* (2013.01)

(58) Field of Classification Search
USPC .......................................................... 718/102
See application file for complete search history.

(56) References Cited

U.S. PATENT DOCUMENTS

| 5,408,663 | A | 4/1995 | Miller | |
|---|---|---|---|---|
| 5,598,532 | A | 1/1997 | Liron | |
| 6,141,686 | A | 10/2000 | Jackowski et al. | |
| 6,721,796 | B1 | 4/2004 | Wong | |
| 6,745,221 | B1 | 6/2004 | Ronca | |
| 6,859,926 | B1* | 2/2005 | Brenner et al. | 718/100 |
| 7,222,345 | B2* | 5/2007 | Gray et al. | 718/104 |
| 8,181,179 | B2* | 5/2012 | Liu | 718/102 |
| 2003/0139918 | A1* | 7/2003 | Hardwick et al. | 703/22 |
| 2003/0148768 | A1* | 8/2003 | Kakani et al. | 455/452 |
| 2003/0158884 | A1* | 8/2003 | Alford, Jr. | 709/104 |
| 2005/0055694 | A1* | 3/2005 | Lee | 718/100 |
| 2005/0076337 | A1* | 4/2005 | Mangan | 718/100 |
| 2005/0240923 | A1* | 10/2005 | Duke | 718/100 |

(Continued)

OTHER PUBLICATIONS

U.S. Appl. No. 11/134,681, filed May 19, 2005.
Rolia, J. et al., "A Capacity Management Service for Resource Pools", 9 pages, Jul. 2005.

(Continued)

*Primary Examiner* — Abdullah Al Kawsar
(74) *Attorney, Agent, or Firm* — Fulbright & Jaworski LLP

(57) ABSTRACT

A system comprises a workload manager evaluator operable to receive a representative workload that is representative of competing workloads that share access to at least one shared computing resource. The workload manager evaluator is operable to evaluate performance of a scheduler that schedules access of the competing workloads to the shared computing resource according to defined control parameter values, wherein the workload manager evaluator evaluates performance of the scheduler under the representative workload for a plurality of different values of the control parameters. In certain embodiments, the workload manager evaluator determines an optimal value for the control parameters of the scheduler for scheduling access to the at least one shared computing resource for the representative workload to satisfy defined performance desires of the system.

19 Claims, 11 Drawing Sheets

(56) References Cited

U.S. PATENT DOCUMENTS

| | | | |
|---|---|---|---|
| 2007/0022426 A1* | 1/2007 | Steinder et al. | 718/104 |
| 2007/0162908 A1* | 7/2007 | Erickson et al. | 718/104 |
| 2008/0244135 A1* | 10/2008 | Akesson et al. | 710/241 |

OTHER PUBLICATIONS

"gWLM: Reference and Additional Topics", Version A.01.01.x; Hewlett-Packard Co., May 2005, 24 pages.

"HP-UX Workload Manager User's Guide", Version A.03.01; Hewlett-Packard Co., 120 pages, Mar. 2006.

* cited by examiner

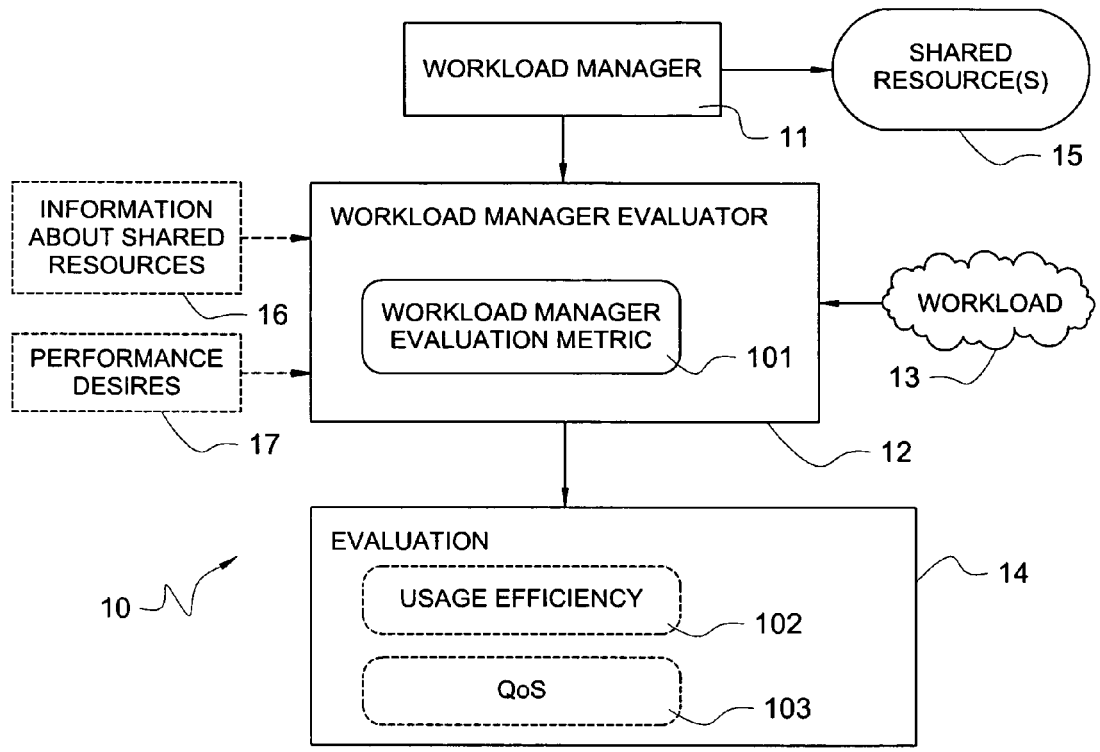

QOS SATISFIED DEMAND: UTIL TARGET IS (0.4, 0.6)

QOS SATISFIED DEMAND: UTIL TARGET IS (0.566, 0.766)

EVALUATING PERFORMANCE OF WORKLOAD MANAGER BASED ON QOS TO REPRESENTATIVE WORKLOAD AND USAGE EFFICIENCY OF SHARED RESOURCE FOR PLURALITY OF MINCPU AND MAXCPU ALLOCATION VALUES

CROSS-REFERENCE TO RELATED APPLICATIONS

The present application is related to concurrently filed and commonly assigned U.S. patent application Ser. No. 11/489,971, filed Jul. 20, 2006 titled "SYSTEM AND METHOD FOR EVALUATING A WORKLOAD AND ITS IMPACT ON PERFORMANCE OF A WORKLOAD MANAGER", and concurrently filed and commonly assigned U.S. patent application Ser. No. 11/489,967, filed on Jul. 20, 2006, titled "SYSTEM AND METHOD FOR ALLOCATING CAPACITY OF SHARED RESOURCES TO A WORKLOAD", the disclosures of which are hereby incorporated herein by reference. The present application is also related to co-pending and commonly assigned U.S. patent application Ser. No. 11/134,681 filed May 19, 2005 titled "SYSTEM AND METHOD FOR DETERMINING A PARTITION OF A CONSUMER'S RESOURCE ACCESS DEMANDS BETWEEN A PLURALITY OF DIFFERENT CLASSES OF SERVICE," the disclosure of which is hereby incorporated herein by reference.

FIELD OF THE INVENTION

The following description relates generally to managing access to resources, and more specifically to systems and methods for evaluating the performance of a workload manager.

DESCRIPTION OF RELATED ART

Resource pools are collections of computing resources, such as clusters of servers, racks of blades, or other computing resources that offer shared access to computing capacity. The utility data center (UDC) available from Hewlett-Packard Company is one example of a resource pool. Depending on the granularity of a given implementation, a resource pool may be a collection of separate computing devices (e.g., separate servers, separate clusters of servers, etc.) or it may be a collection of resources on a common computing device (e.g., multiple processors on a single server). Various types of resource pools are known, and techniques have been developed for managing access to such resource pools. For instance, virtualization services have been developed that offer interfaces that support the lifecycle management (e.g., create, destroy, move, size capacity) of resource containers (e.g., virtual machines, virtual disks) that provide access to shares of resource capacity (e.g., CPU, memory, input/output). Various consumers (e.g., applications) may share access to the resources of a resource pool. That is, various consumers may share utilization of the resources in a resource pool for servicing their respective workloads. In this sense, a "consumer" refers to anything (e.g., process, etc.) that consumes capacity of the pool's resources. A consumer generally consumes capacity for use in servicing the consumer's workload. Thus, the consumer has a "demand" for capacity from the resource pool for servicing its workload in a desired manner. In some implementations, workloads are assigned to the resource containers which are then associated with resources. A "computing resource," as used herein, refers to any resource now known or later developed that a consumer utilizes in servicing a workload, including without limitation processing resources (e.g., CPUs), data storage resources (e.g., memory, hard drive, etc.), communication resources (e.g., communication ports, bandwidth, etc.), and input/output (I/O) resources, as examples. Resources in a pool have capacity attributes, e.g., CPU, memory, I/O operation rates, and bandwidths, each with limited capacity.

To facilitate sharing of a resource pool's capacity between a plurality of consumers (e.g., a plurality of applications), some type of scheme for managing allocation of the pool's capacity among the consumers may be employed. Without such management of allocation, a given consumer may consume all or substantially all of the pool's capacity for servicing its workload, thus leaving the remaining consumers with insufficient capacity for supporting their respective workloads. Accordingly, consumers generally desire some assurance that they will be allocated sufficient capacity of the resource pool to enable the consumers to satisfy their respective quality of service (QoS) goals. As discussed further below, workload managers may configure schedulers to allocate capacity of a resource pool among the consumers in an attempt to manage such allocation in a manner that provides some assurance that the consumers can satisfy their QoS goals (e.g., by balancing allocation among the consumers).

When managing resource pools, application workloads may be assigned to resource containers that are then associated with resources in the pool. Management may occur at several different timescales. Long-term management corresponds to capacity planning and takes place over many months. Over a medium-timescale, e.g. days or months, groups of resource containers are found that are expected to share resources well. These containers are then assigned to their corresponding resources. Capacity management tools can be used to automate such a process. Once resource containers are assigned to a resource, a workload manager for the resource governs access to resource capacity over short time scales, e.g. 15 seconds. A workload manager can provide static allocations of capacity or change the per-resource container allocations based on time-varying workload demand.

Each resource in a pool may have a scheduler that monitors its workloads' demands and dynamically varies the allocation of capacity, e.g., CPU, to the workloads, thereby managing the utilization of the resources by the various consumers. For instance, the scheduler may dynamically vary allocation of the pool's capacity in a manner that attempts to provide each consumer with access only to the capacity it needs (for servicing its current workload). As a workload's demand increases, the scheduler may increase the amount of the resource pool's capacity that is allocated to such workload; and as a workload's demand decreases, the scheduler may decrease its allocation of the resource pool's capacity to such workload.

A workload manager may utilize several control parameters for controlling a scheduler's scheduling of resource capacity. Various schedulers are known, including without limitation proportional-share schedulers and weighted proportional-share schedulers. As these and other schedulers are well known, operation of an exemplary scheduler is only briefly described herein so as not to detract attention from the inventive concepts presented herein. The control parameters for a scheduler may include the following parameters for each workload: a gain parameter that affects how quickly the workload's allocation increases or decreases based on its current demand, a minimum CPU allocation (minCPU allocation) parameter that defines a minimum allocation of CPU for the workload even in the absence of demand, a maximum CPU allocation (maxCPU allocation) parameter that defines a maximum allocation of CPU for the workload, a lower allocation utilization threshold (lowerAllocUtil threshold) that defines a threshold amount which if the measured utilization of allocation for the workload for a previous schedule interval drops below then the allocation to the workload is decreased by the scheduler based on the gain parameter (but not below the minCPU allocation amount), and an upper allocation utilization threshold (upperAllocUtil threshold) that defines a threshold amount which if the measured utilization of allocation for the workload for a previous schedule interval exceeds then the allocation to the workload is increased by the scheduler based on the gain parameter (but not above the maxCPU allocation amount). The control parameters may be set to values that attempt to strike a balance between allocating sufficient resource capacity to a given workload to satisfy the consumer's quality of service (QoS) goals and also enabling resource capacity for satisfying the QoS desires for other workloads that share the resources. From a given consumer's point of view, having maximum capacity allocated to it may be desirable because that ensures that the consumer has the maximum capacity available from the resource pool for servicing its workload. From a resource pool manager's point of view, however, it is often desirable to limit the amount of capacity allocated to each consumer, as this allows more cost effective utilization of the pool's resources by enabling greater capacity that is available to be used by other consumers. Thus, a balance may be struck in which a certain amount of capacity is allocated to a consumer that is believed to be sufficient to satisfy the consumer's quality of service (QoS) goals, while permitting remaining capacity to be allocated to other consumers. The scheduler for a resource pool may be configured (e.g., via the above-mentioned control parameters) to manage the allocation of the resource pool's capacity to consumers in a manner that achieves such a balance in accordance with a desired resource management strategy.

Difficulty arises in evaluating performance of workload managers. That is, difficulty arises in evaluating performance of a scheduler having defined values of control parameters set by a workload manager. For instance, one may evaluate whether a given workload's QoS desires are being satisfied under a given set of defined control parameters for a scheduler, but one would not know whether the control parameters set for the scheduler are the cause of poor QoS or whether the control parameters can be improved in some way (e.g., to maintain QoS satisfaction and improve resource utilization). Accordingly, difficulty arises in determining optimal control parameters to be set for a scheduler by a workload manager because no effective metric for evaluating the performance under various control parameters is available. Thus, a desire exists for a metric that may be employed by systems and methods for evaluating the performance of workload managers (e.g., to evaluate control parameters set for a scheduler and/or to determine optimal control parameters to be set for the scheduler).

BRIEF DESCRIPTION OF THE DRAWINGS

FIG. 1 shows an exemplary system according to one embodiment of the present invention;

FIG. 2 shows an operational flow diagram for evaluating performance of a workload manager according to certain embodiments of the present invention;

DETAILED DESCRIPTION

Figure 3:
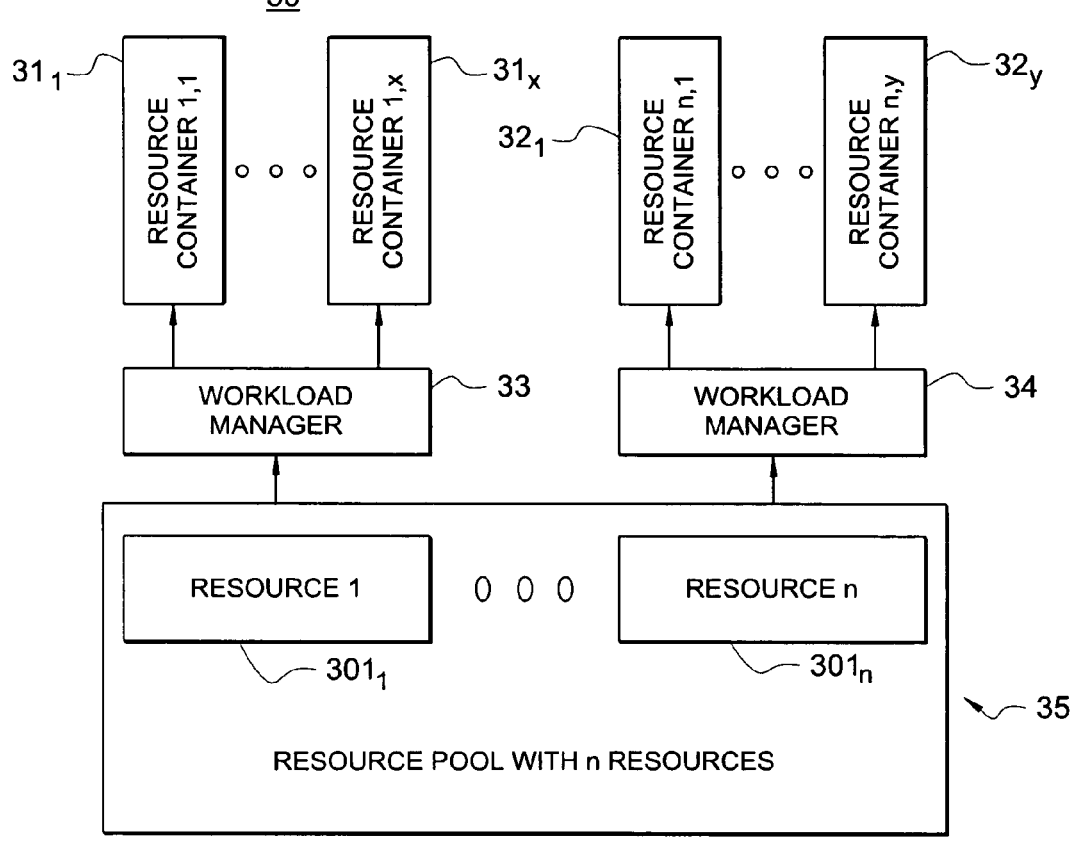
FIG. 3 shows an exemplary system illustrating the relationship between resource containers, workload managers, resources, and a resource pool according to one embodiment of the present invention.

FIG. 1 shows an exemplary system 10 according to one embodiment of the present invention. As shown, system 10 includes a workload manager 11 that is operable to manage access by workloads (e.g., application workloads) to capacity of shared resources 15, which may be resources in a resource pool. Shared resources 15 may be any type of computing resource that a consumer utilizes in servicing a workload, including without limitation processing resources (e.g., CPUs), data storage resources (e.g., memory, hard drive, etc.), communication resources (e.g., communication ports, bandwidth, etc.), and input/output (I/O) resources, as examples. Such shared resources 15 have capacity attributes, e.g., CPU, memory, I/O operation rates, and bandwidths, each with limited capacity. Thus, workload manager 11 manages access of competing consumer workloads to such limited resource capacity. In so doing, workload manager 11 may define control parameters for a scheduler, such as a proportional-share scheduler, which dictate a scheduling scheme to be employed by such scheduler for scheduling access by competing consumer workloads to the shared resources 15. In certain embodiments, the scheduling scheme may be a dynamic scheme that varies depending on the respective demands of the competing workloads. In other embodiments, the scheduling scheme may be static.

System 10 further includes a workload manager evaluator 12 that is operable to evaluate the performance of workload manager 11 under a given workload 13. Workload manager evaluator 12 may be a software program stored to a computer-readable medium (e.g., memory, hard disk, optical disc, magnetic disk, or any other data storage device now known or later developed) and executing on a processor-based device, such as a personal computer (PC), laptop computer, server computer, etc. Of course, the functionality of workload manager evaluator 12 may be implemented in software, hardware, firmware, or any combination thereof. Thus, workload manager evaluator 12 may be employed as any type of evaluation logic, whether software, hardware, firmware, or any combination thereof. As described further herein, workload manager evaluator 12 may, in certain embodiments, evaluate performance of a modeled workload manager (e.g., a simulated model of a workload manager 11).

In certain embodiments, workload 13 is an expected (e.g., historical, simulated, etc.) workload 13 for a given system. That is, workload 13 may be a representative workload of consumer(s) in a given system, which may be an actual historical workload collected for the consumer(s) or a synthetic workload generated to represent the workload of the consumer(s), as examples. In one embodiment, workload 13 includes data identifying various time periods and the corresponding demands for resource access (e.g., CPU utilization) desired by a consumer. For instance, workload 13 may comprise a sequence of timestamps (which may be 5 seconds apart, 5 minutes apart, etc., depending on the appropriate time granularity for the environment/resource) and the corresponding resource utilization (e.g., CPU, I/O, network, or other resource utilization) for each timestamp. Such workload 13 thus provides an estimation of the future workload expected for the consumer(s) of the system under evaluation. For instance, a historical workload of, say, 3 months of usage of the system's consumers, may provide a good estimation of a future workload expected to be incurred by the consumers. Thus, workload 13 comprises a plurality of competing workloads demanding access to the shared resource(s) 15 over time.

In the example of FIG. 1, workload manager evaluator 12 employs a workload manager evaluation metric 101 for evaluating the performance of workload manager 11 under workload 13. Workload manager evaluation metric 101 may, for example, be used in a software application that is executing on a processor for evaluating performance of workload manager 11 under workload 13. As described further below, in certain embodiments, the workload manager evaluator 12 employs workload manager evaluation metric 101 to evaluate one or more control parameter settings of a scheduler. Thus, workload manager evaluator 12 outputs an evaluation 14 of workload manager 11 under workload 13. Evaluation 14 may comprise various information about the performance of workload manager 11 (e.g., with one or more defined scheduler control parameters), such as usage efficiency evaluation 102 and QoS evaluation 103.

In certain embodiments, workload manager evaluator 12 may receive further information that it uses in making the evaluation. For instance, in certain embodiments, workload manager evaluator 12 may receive information 16 about the shared resources 15, such as information indicating the capacity of the shared resources 15. For instance, in a first system under evaluation the shared resources 15 may comprise 1 CPU, where workload manager 11 manages access of competing workloads to such CPU; and in a second system under evaluation the shared resources 15 may comprise 8 CPUs, where workload manager 11 manages access of competing workloads to the computing capacity of the 8 CPUs. Thus, in certain embodiments, workload manager evaluator 12 receives information 16 indicating the capacity of the shared resources 15 of a given system under evaluation. In other embodiments, such information 16 may not be provided to workload manager evaluator 12. As another example, in certain embodiments, workload manager evaluator 12 may receive performance desires 17, which define the goals desired to be achieved in a given system. For instance, performance desires 17 may specify the respective QoS desires of the competing workloads in the system (which may correspond to QoS guarantees set out in service level agreements (SLAs) for the consumers) and/or the resource utilization goals (e.g., usage efficiency) desired by a system administrator. In certain embodiments, information 16 and/or 17 may be received as input to a user interface of workload manager evaluator 12, where information 16 and/or 17 may be input by a user. Of course, information 16 and/or 17 may be received by workload manager evaluator 12 in any other manner, such as by reading such information from a file.

In certain embodiments, for instance, a user may specify values for certain control parameters, and the workload manager evaluator 12 may evaluate one or more other control parameters to determine optimal values for such other control parameters under workload 13. For instance, a user may specify (e.g., as part of performance desires 17) values for certain scheduler control parameters (which may be referred to herein as "desired performance parameters"), such as lowerAllocUtil and UpperAllocUtil thresholds, and the workload manager evaluator 12 may determine optimal values for other control parameters, such as MinCPU and MaxCPU allocation parameters. For example, given predefined values for certain control parameters, such as lowerAllocUtil and UpperAllocUtil thresholds, the workload manager evaluator 12 may evaluate (using evaluation metric 101) the performance in servicing workload 13 for one or more values that may be set by workload manager 11 for other control parameters, such as MinCPU and MaxCPU allocation parameters. Thus, as described further herein, embodiments of the present invention provide a tool for evaluating the performance of a workload manager 11 in setting certain control parameters (e.g., when values of certain other control parameters are pre-defined according to performance desires of a user).

As described further herein, a set of new metrics, as well as an exemplary simulation model for computing such metrics, are disclosed herein. The metrics may be employed as evaluation metrics 101 for use in evaluating one or more control parameter values that may be defined for a scheduler by a workload manager. Thus, the metrics may be used (e.g., by workload manager evaluator 12) to guide the choice of appropriate (or optimal) parameter values for a workload manager to define for a scheduler in order to achieve desirable level of application QoS, while minimizing the resource usage.

FIG. 2 shows an operational flow diagram for evaluating performance of a workload manager according to certain embodiments of the present invention. In operational block 201, a workload manager evaluator (e.g., workload manager evaluator 12 of FIG. 1) receives a representative workload (e.g., workload 13 of FIG. 1) that comprises a plurality of competing workloads demanding access to at least one shared resource (e.g., shared resource 15 of FIG. 1). In operational block 202, the workload manager evaluator evaluates performance of a scheduler in scheduling access to the at least one shared resource under the representative workload. As described further herein, the workload manager evaluator may use the evaluation metrics 101 for performing such evaluation. Further, in certain embodiments, the workload manager evaluates performance of the scheduler for each of a plurality of different values of at least one control parameter of the scheduler. In operational block 203, the workload manager evaluator determines an optimal value for the at least one control parameter of the scheduler for scheduling access to the at least one shared resource for the representative workload to satisfy defined performance desires of the system. For instance, as described further herein, a plurality of values for a minCPU allocation and maxCPU allocation control parameters may be evaluated to determine optimal ones of the plurality of values for such control parameters.

An exemplary system for which embodiments of the present invention may be employed is described below with FIGS. 3-4. Such embodiments are merely exemplary for illustration of application of the concepts presented herein, and application of the concepts of the present invention are not intended to be limited to such exemplary embodiments. For instance, while an exemplary proportional-share scheduler and its corresponding control parameters are described below, embodiments of the present invention are not limited in application to such a proportional-share scheduler; but rather, the exemplary proportional-share scheduler provides a basis for discussion of various concepts of the present invention, which those of ordinary skill in the art will readily appreciate may be likewise employed for application to other types of schedulers.

Figure 4:
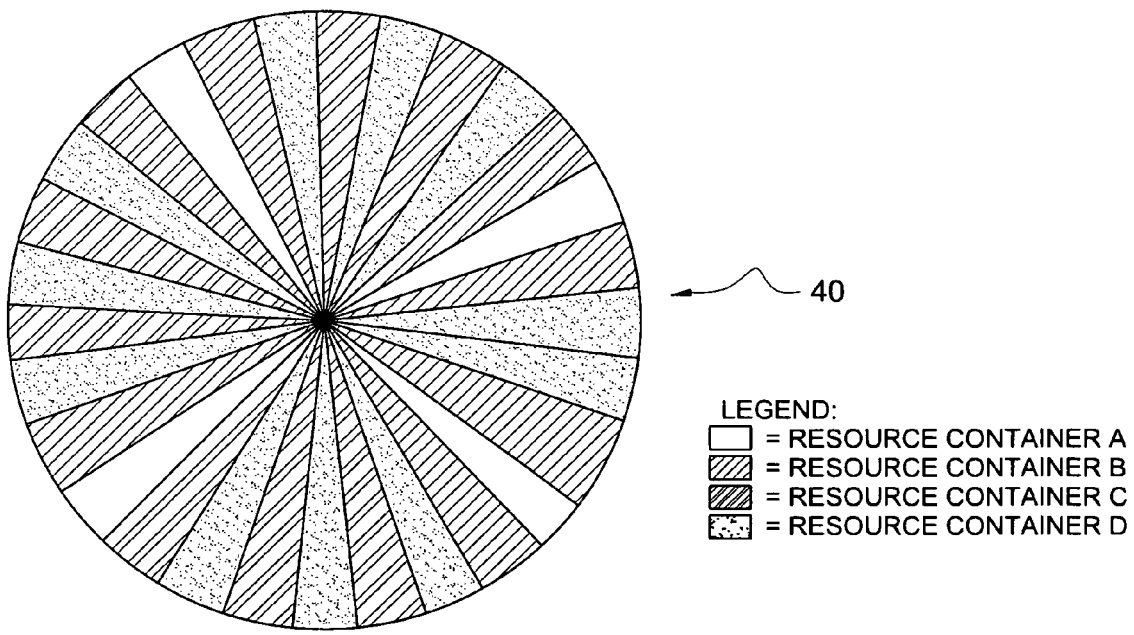
FIG. 4 shows an exemplary pie chart that illustrates a schedule for a proportional-share scheduler that supports several resource containers, according to one embodiment of the present invention.

FIG. 3 shows an exemplary system 30 illustrating the relationship between resource containers, workload managers, resources, and a resource pool according to one embodiment of the present invention. System 30 reflects an architecture commonly used for managing access to shared resources, such as is employed by the gWLM and WLM products available from Hewlett Packard Development Company, L.P. System 30 includes a resource pool 35 that includes a collection of resources $301_1$-$301_N$ (where N is any number), collectively referred to as resources 301. Such resources 301 may be any type of computing resources, such as clusters of servers or racks of blades, that offer shared access to computing capacity.

System 30 also includes resource containers $31_1$-$31_X$ (where X is any number), collectively referred to as resource containers 31, and resource containers $32_1$-$32_Y$ (where Y is any number), collectively referred to as resource containers 32. Resource containers 31 and 32 may be, as an example, virtual machines that are provided with access to shares of resource capacity (e.g., CPU, memory, input-output) via a scheduling scheme managed by workload managers 33 and 34, respectively. That is, in this example, workload manager 33 manages the scheduling of access by the workloads of resource containers 31 to the associated resources in pool 35, while workload manager 34 manages the scheduling of access by the workloads of resource containers 32 to the associated resources in pool 35. While two workload managers 33 and 34 with respective resource containers 31 and 32 are shown for ease of illustration in this example, those of ordinary skill in the art will recognize that any number of such workload managers may be so implemented in system 30. Further, any number of resource pools each comprising any number of resources therein may be employed in a given implementation of system 30. Additionally, any scheduling scheme now known or later developed may be employed by workload managers 33 and 34, such as employing known proportional-share schedulers or weighted proportional-share schedulers.

In this example, when managing a resource pool 35, application workloads are assigned to resource containers 31, 32 that are associated with resources 301 in the pool. For instance, in this example resource containers 31 are associated with resource(s) $301_1$, and resource containers 32 are associated with resource(s) $301_N$. In other words, the workloads assigned to resource container 31 are requesting access to certain resources $301_1$ that are pre-associated with resource container 31, and the workloads assigned to resource container 32 are requesting access to certain resources $301_N$ that are pre-associated with resource container 32. Thus, each of resource containers $31_1$-$31_X$ correspond to a separate workload that is competing for access to shared resource $301_1$.

Generally, management of the resource pool 35 may occur at several different timescales. Long-term management typically corresponds to capacity planning and may take place over several months. Over a medium timescale, e.g., days or months, groups of resource containers, such as containers 31 and 32 in FIG. 3, are found that are expected to share resources well. These containers are then assigned to their corresponding resources. For instance, resource containers 31 share access to resource(s) $301_1$, while resource containers 32 share access to resource(s) $301_N$ in this example. Capacity management tools can be used to automate such a process, or the assignment of containers to resources may be performed manually. Techniques now known or later developed may be employed for assigning workloads to a resource container and/or for associating resources with a container, and such techniques are thus not described further herein so as not to detract attention from the inventive concepts presented herein.

Once resource containers are assigned to a resource, a workload manager for the resource governs access to resource capacity over short timescales, e.g., 15 seconds or similar time intervals. Thus, workload manager 33 governs (or manages) access of workloads in containers 31 to computing capacity of resource $301_1$, while workload manager 34 governs (or manages) access of workloads in containers 32 to computing capacity of resource $301_N$, in this example. Each workload manager can provide static allocations of capacity or change the per resource container allocations based on time-varying workload demand.

Each resource container is associated with an entitled number of shares of an associated resource. For example, each of resource containers $31_1$-$31_X$ may be associated with an entitled number of shares of a CPU resource(s) $301_1$. The entitled number of shares correspond to an upper bound on the allocation of resources for the container. Workload manager 33 dynamically varies the allocation of shares to each resource container $31_1$-$31_X$ to permit a more efficient use of the shared resource(s) $301_1$. In one embodiment, the workload manager is layered upon a proportional-share scheduler; but embodiments of the present invention are not limited in application to such an implementation but may likewise be employed for other types of schedulers now known or later developed. An exemplary implementation of a proportional-share scheduler is described hereafter for illustrative purposes.

The proportional-share scheduler utilized in one embodiment provides bounded access to resources for each resource container. The scheduler is configured to offer a share of a resource (e.g., a CPU resource). For instance, the scheduler may be configured to offer 10 millisecond (msec) CPU timeslices. Of course, timeslices may be offered according to some other time interval. FIG. 4 shows an exemplary pie chart 40 that illustrates a schedule for such a proportional-share scheduler that supports several resource containers, identified as resource containers "A", "B", "C", and "D", according to one embodiment of the present invention. Resource containers A-D may correspond to resource containers 31 or to resource containers 32 of FIG. 3, as examples. Each piece of the pie represents one timeslice. Similarly shaded slices correspond to the same resource container, as indicated in the accompanying legend of FIG. 4. With bounded access, the scheduler advances from slice to slice every 10 msec regardless of whether resources are used or not, i.e. it is a non-work-conserving scheduler. This provides for performance isolation. Each container receives its particular service rate regardless of whether any of the containers are using resources (i.e., regardless of the workload demands). Such isolation can be desirable in a shared resource environment for enterprise applications as it gives the appearance of dedicated access to resources. Adding new workloads (with corresponding new containers) to the pool has little impact on the performance behavior of workloads already in the pool.

The schedule is chosen to provide each resource container with access to its allocated shares. In this example, the scheduler spreads each resource container's shares as evenly as possible over the pie to deliver what may be perceived as a smooth service rate. Though the pie 40 illustrates a schedule for access to one CPU, a workload may be assigned shares from many CPUs (or other types of shared resources) such that its total allocation equals its number of shares. Workload schedulers may use heuristics to best match the offered concurrency over all CPUs with the level of concurrency a workload is able to exploit. However, when more CPUs are used, the service rate per-CPU diminishes and the per-CPU schedules may differ. In this exemplary embodiment, no assumption is made about whether the schedules for multiple CPUs are synchronized.

An inherent problem of a fixed schedule, i.e., fixed allocations, is that resources may not be used as efficiently as desired. In such an implementation, each resource container is sized to support its peak capacity requirements. That is, each resource container is allocated sufficient number of CPU timeslices to support its peak capacity requirements. Yet, most applications rarely need their peak amount. Workload managers aim to dynamically allocate the capacity associated with resource containers to facilitate resource sharing. As mentioned above, the workload manager (e.g., workload managers 33 and 34 of FIG. 3) considered in one exemplary embodiment is layered on top of a proportional-share scheduler and dynamically adjusts the allocation of each resource container based upon the current demands of the resource container. For example, if a workload of a given resource container goes idle, then its allocation can be reduced (e.g., the number of timeslices allocated to such container in pie 40 of FIG. 4 may be reduced); and if the workload becomes very busy, then its allocation can be increased (e.g., the number of timeslices allocated to such container in pie 40 of FIG. 4 may be increased). The workload manager may define control parameters that control such dynamic reallocation by the scheduler, as discussed further below.

Adjusting the allocation of resource capacity to containers based on demand permits statistical multiplexing within a resource pool. For ease of discussion, such multiplexing is not considered in this embodiment. Analysis of this exemplary embodiment of a scheduler assumes that each workload gets access to capacity according to its demands and the allocation decisions of the workload manager algorithm. The analysis is with respect to a workload within its resource container.

The workload managers 33 and 34 considered in this exemplary embodiment each corresponds to a negative feedback controller. Each workload manager has several control parameters, including the following control parameters:

schedule interval is a parameter that is applied for all workloads managed by the workload manager. The workload manager computes a new schedule for the proportional-share scheduler at the end of each schedule interval;

gain—a parameter that affects how quickly a workload's allocation increases or decreases based on its current demand;

minCPU allocation—a minimum allocation amount, i.e. even in the absence of demand, the allocation cannot go lower than minCPU amount;

maxCPU allocation—maximum allocation amount for the workload;

lowerAllocUtil threshold—a parameter that triggers a decrease of the allocation, i.e. if the measured utilization of allocation for a workload for the previous schedule interval drops below the lower AllocUtil value, then the allocation is decreased based on the gain value, but it never goes below the minCPU allocation amount; and upperAllocUtil threshold—a parameter that triggers an increase of the allocation, i.e. if a utilization of allocation goes above the upperAllocUtil then the allocation is increased based on the gain value, but it can not go higher than maxCPU allocation amount.

In operation of this exemplary scheduler, the allocation (e.g., of CPU timeslices to a given workload) does not change when utilization of allocation for such workload falls within the range lowerAllocUtil and upperAllocUtil. Further, the allocation never goes out of the range minCPU allocation and maxCPU allocation. These conditions help to avoid hysteresis, limit the impact of one workload on others, and ensure resource access quality of service when a workload is transitioning from an idle to busy period. Note that for this exemplary embodiment: $0 \leq lowerAllocUtil \leq upperAllocUtil \leq 1$. It should be further noted that while this exemplary embodiment is described for a CPU resource, the concepts may be likewise applied to other shared resources. Thus, for instance, the minCPU allocation and maxCPU allocation parameters may be referred to generically as "minResource allocation" and "maxResource allocation" for defining the minimum and maximum allocation amounts of any shared resource.

According to one embodiment, there are two parameters in the above set of identified control parameters that are closely related to desired application performance, and are typically set by the customers of the applications:

A) lowerAllocUtil threshold, which defines a utilization of allocation that supports ideal application performance. Clearly, the utilization of allocation lower than $U^{low}$ also supports the ideal application performance, however at a price of underutilized (over-allocated) resources.

B) upperAllocUtil threshold, which defines a threshold on utilization of allocation beyond which the application performance would be undesirable to users.

The other control parameters, such as gain, minCPU allocation, and maxCPU allocation, are tuned by the workload manager in attempt to best support application performance.

Thus, certain ones of the scheduler's control parameters may be referred to as desired performance parameters, which may be defined by a user. For instance, in certain embodiments, a user may define values for desired performance parameters, such as lowerAllocUtil and upperAllocUtil thresholds, and the workload manager determines optimal values for the remaining scheduler control parameters. It should be recognized that the desired performance parameters defined by a user (e.g., lowerAllocUtil and upperAllocUtil thresholds) may also themselves be control parameters used by a scheduler. Thus, in certain embodiments, a user defines certain desired performance parameters (e.g., scheduler control parameters), and the workload manager determines the values for the other control parameters used by the scheduler. Given the values defined by the user for certain desired performance parameters, such as lowerAllocUtil and upperAllocUtil thresholds, the workload manager determines the values of other scheduler control parameters, such as gain, minCPU allocation and maxCPU allocation. As described further herein, embodiments of the present invention provide a workload manager evaluator that is operable to evaluate the performance of the workload manager in setting the values of the other control parameters. For instance, as described further herein, in certain embodiments the workload manager evaluator is operable to evaluate various values that may be set for the control parameters (given the user-defined desired performance parameters) under a given workload to determine the optimal value for such control parameters. Further, in certain embodiments, the operations of different workload managers (e.g., in setting the scheduler control parameter values) may be compared (or otherwise evaluated) based on a common evaluation metric that is computed by the workload manager evaluator for each workload manager.

A workload manager may be modeled by a simulation model. An exemplary simulation model of a workload manager that may be employed in certain embodiments is described below. Of course, other simulation models for modeling a given workload manager to be evaluated may be similarly employed in other embodiments. The exemplary simulation model uses the following notation:

i—the current time interval;

$D_i^{new}$—a new incoming workload demand in interval i; and $D_i^{carry\_forw}$ the portion of demand that that was not satisfied in interval i−1 and is therefore carried forward to interval i. For each time interval, $D_i^{carry\_forw}$ is computed according to the following formula:

$$D_i^{carry\_forw} = \max(D_{i-1} - A_{i-1}, 0);$$

$D_i$—the total demand in interval i, where $D_i = D_i^{new} + D_i^{carry\_forw}$; and $A_i$—the allocation provided by the controller in time interval i.

At the end of interval i, the workload manager computes a new allocation $A_{i+1}$ for the workload for interval i+1 using the following policies:

1. If lowerAllocUtil≤$D_i/A_i$≤upperAllocUtil then there is no change in the allocation, and $A_{i+1}=A_i$.

2. If $D_i/A_i$≤lowerAllocUtil then the controller attempts to decrease the next interval allocation:

$$A_{i+1} = A_i - \text{gain} \times \left(A_i - \frac{D_i}{lowerAllocUtil}\right).$$

If $A_{i+1}$≤minCPU then $A_{i+1}$=minCPU

3. If upperAllocUtil≤$D_i/A_i$ then the controller attempts to increase the next step allocation:

$$A_{i+1} = A_i + \text{gain} \times \left(\frac{D_i}{upperAllocUtil} - A_i\right).$$

If maxCPU≤$A_{i+1}$ then $A_{i+1}$=maxCPU.

The workload manager takes the computed allocations for each workload's resource container and associates them with a schedule, i.e., for time interval i+1. The proportional-share scheduler then serves short timeslices, such as those shown in FIG. 4, according to the schedule until the end of the interval.

Since allocation cannot go lower than minCPU amount, it may be tempting to set such an allocation to a very small value. However, in this case, it may take several schedule intervals to increase an allocation to a correct size when there is a burst of incoming demand. This may present a resource access quality of service issue for interactive workloads with infrequent bursts of requests, as the requests that start the bursts may incur long response times before the scheduler properly reallocates the shared resource capacity over many scheduling intervals.

The choice of lower and upper utilization of allocation thresholds is based on the responsiveness requirements and arrival process of a workload. The greater the burstiness in arrivals, and the greater the responsiveness requirements, the lower the acceptable utilization of allocation. This is because utilization of allocation is measured over an interval, e.g., 15 seconds, so it conceals the bursts of demand within the interval. For this reason, resource allocations are typically larger than resource demands. This limits the potential utilization of resources in a resource pool.

Determining an appropriate utilization of allocation range can be either a categorical or empirical exercise. A categorical approach could consider several classes of service, each associated with a range. Each workload may be assigned to one of the classes based on business need. The highest quality class may represent business critical where high response times may affect the revenue or image of the business. The lowest class may be for workloads where higher response times have no significant business impact. An exemplary technique for determining different classes of service to be assigned to the competing workloads is described further in co-pending and commonly assigned U.S. patent application Ser. No. 11/134,681 filed May 19, 2005 titled "SYSTEM AND METHOD FOR DETERMINING A PARTITION OF A CONSUMER'S RESOURCE ACCESS DEMANDS BETWEEN A PLURALITY OF DIFFERENT CLASSES OF SERVICE," the disclosure of which is hereby incorporated herein by reference. An empirical exercise for a specific application would look at its arrival and service time processes to determine a utilization of allocation range that satisfies application-specific response time requirements.

Figure 5:
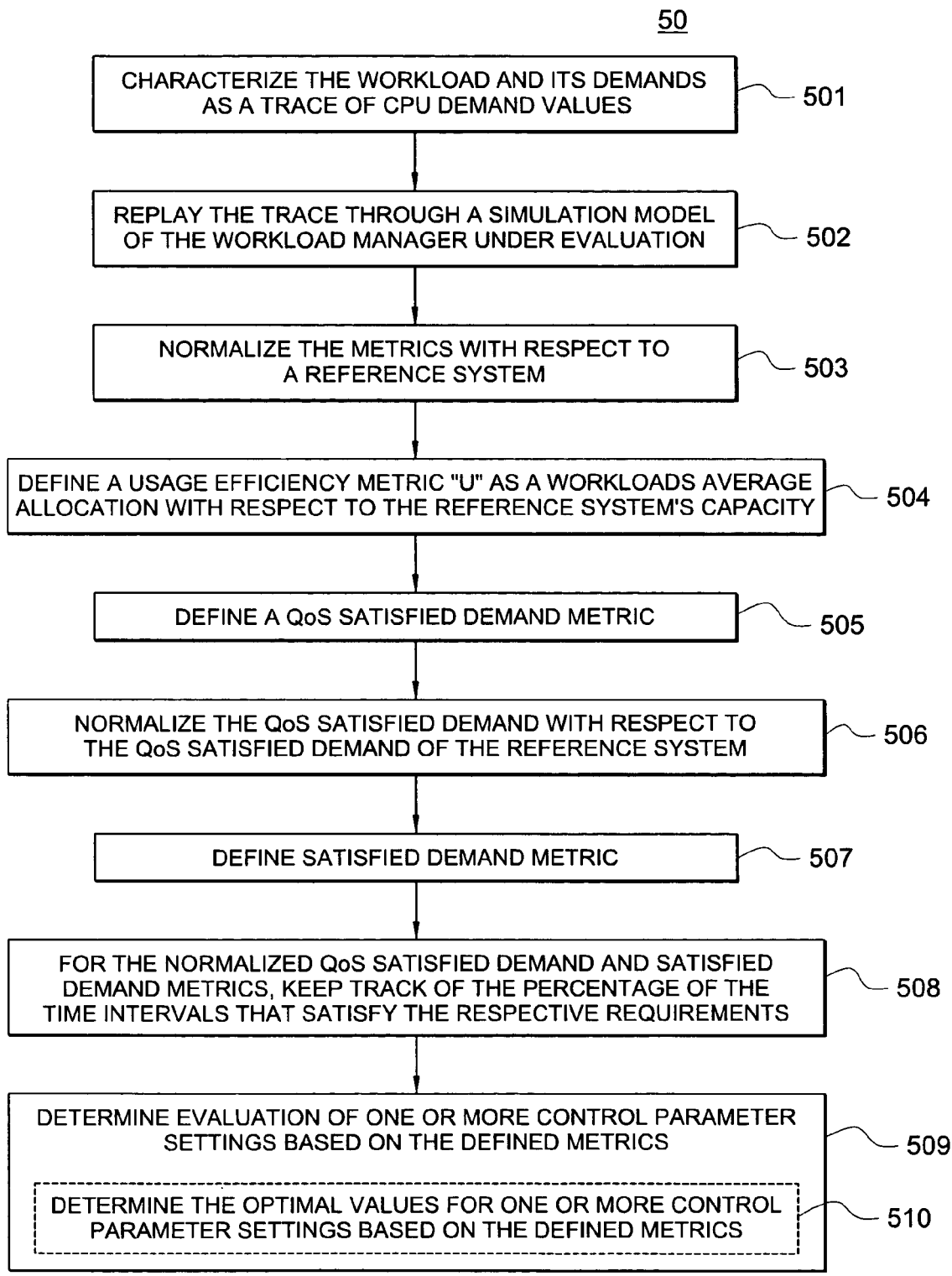
FIG. 5 shows an exemplary operational flow diagram for determining workload manager evaluation metrics according to one embodiment of the present invention.

As discussed above with FIG. 1, in certain embodiments a workload manager evaluation metric 101 is provided for evaluating the workload manager's performance, such as for measuring resource usage efficiency and resource access QoS. FIG. 5 shows an exemplary operational flow diagram for determining such a workload manager evaluation metric 101 according to one embodiment of the present invention. According to one embodiment, the operational measures, such as measurement of resource usage efficiency and resource access QoS, are computed by workload manager evaluator 101 over a representative time period for a workload's demands, e.g., hours or months. Thus, for instance, representative workload 13 may be historical workloads collected for a system over such a time period. In operational block 501, the original workload and its demands are characterized as a trace of CPU demand values for the time period, with one CPU demand value per schedule interval. In operational block 502, values for the metrics are computed with respect to a particular set of workload manager control parameters by replaying the trace through the simulation model of the workload manager, such as the exemplary model described above. Thus, the trace is replayed through the modeled workload manager to determine the control parameter values set by the workload manager for the workload and the corresponding evaluation metrics for the performance (e.g., resource usage efficiency U and resource access QoS).

To facilitate the comparison of alternative parameter settings, the metrics are normalized with respect to a reference system in block 503. The reference system is assumed to have a fixed capacity, i.e., its allocation does not change over time. In a reference system with N CPUs, all CPUs are statically allocated to workload for all time intervals. We denote this reference capacity as allocation $A_{ref}$.

Consider a trace of demands $D_i^{new}$ for intervals $i=1,\ldots,T$ for a trace with T demand measurements. Let $A_i$ be the CPU allocation for interval i as it is computed by the workload manager control algorithm.

In block 504, usage efficiency "U" is defined as a workload's average allocation with respect to the reference system's capacity as follows:

$$U = \frac{\left(\sum_{i=1}^{i=T} A_i\right)/T}{A_{ref}}.$$

A lower value for U corresponds to a lower usage of the reference capacity and hence leads to greater efficiency because the unused resources can be used by other workloads.

In block 505, resource access quality of service (QoS) is defined using the metric QoS satisfied demand ("$D^{QoS}$"). This is the portion of total demand that is satisfied in intervals that have utilization of allocation less than or equal to upperAllocUtil. In this example, $D^{QoS}$ is defined as follows:

$$D^{QoS} = \sum_{i=1}^{i=T} D_i, \text{ such that } \frac{D_i}{A_i} \leq upperAllocUtil.$$

It should be noted that $D_i$ includes carry forward demand $D_i^{carry\_forw}$, since $D_i = D_i^{new} + D_i^{carry\_forw}$ as defined above. The quicker the workload manager controller adapts to provide the correct allocation, the higher fraction of the carried forward demand might be QoS satisfied demand.

Intuitively, the reference system helps to set the QoS expectations. Since its allocation does not change over time and it always allocates the maximum capacity of the reference system, the reference system shows what fraction of workload demands can be QoS satisfied under its maximum possible capacity allocation.

To facilitate comparison with the reference system (and in such a way, between different systems), in block 506, the QoS satisfied demand that corresponds to a workload control parameter configuration scenario, $D^{QoS}$, is normalized with respect to the QoS satisfied demand of the reference system, $D_{ref}^{QoS}$. This normalization characterizes the portion of demand that is QoS satisfied demand with respect to the reference system. This is referred to herein as normalized QoS satisfied demand $Q^D$, and is defined as:

$$Q^D = \frac{D^{QoS}}{D_{ref}^{QoS}}.$$

When $Q^D=1$, the amount of QoS satisfied demand is the same as was measured for the reference system. For systems with higher capacity than the reference system, $Q^D$ can be greater than 1, meaning that the amount of QoS satisfied demand is higher than for the reference system.

In block 507, the metric Satisfied Demand $S^D$ is defined, which corresponds to the portion of total demand that is satisfied in intervals where the demand is less than or equal to the allocation:

$$S^D = \frac{\sum_{i=0}^{i=T} D_i}{D},$$

such that $D_i \leq A_i$, where D is the sum of demands $D_i^{new}$ over the T time intervals.

For metrics $Q^D$ and $S^D$, the percentage of the time intervals that satisfy the respective requirements is tracked, in block 508, resulting in the $Q^P$ and $S^P$ metrics, respectively. These metrics bring additional perception of time for characterizing resource access quality of service. For example, the $Q^P$ metric reflects the percentage of time intervals (amount of time) during which QoS satisfied access to CPU capacity is provided. These metrics have values between 0 and 1. In this embodiment, these values are not normalized.

In this embodiment, the workload manager evaluator relies on resource usage based metrics as measures of application workload quality of service because metrics from within an application's context, such as response times, are hard to obtain in general. The workload manager evaluator uses the metrics to show how well the workload manager under evaluation is providing shared resource capacity in proportion to a workload's needs.

In certain embodiments, different classes of service may be assigned to different workloads. In such embodiments, a $Q^D$ value can be associated with each class of service offered by the resource pool. In some sense, the $Q^D$ value reflects how quickly the workload manager reacts to changing loads. In this example, when $Q^D<1$ then a lower percentage of demand is being satisfied in the intervals with utilization of allocation less than upperAllocUtil than for the reference system. When $Q^D>1$, it suggests that more demand is being satisfied in such intervals than for the reference system.

In certain embodiments, the workload manager evaluator 12 can use the above-described metrics for evaluating the performance of various control parameter settings under the workload 13, in block 509. The evaluations of the workload manager performance (e.g., the evaluation of the control parameter values) are made by the workload manager evaluator 12 based at least in part on the above-defined metrics, shown as workload manager evaluation metric 101 in FIG. 1. For instance, different workloads might target different service support from the workload manager specified by different metrics (or their combination), such as the following metrics:

$Q^D$—the percentage of overall demand that is QoS satisfied demand, i.e. for this portion of demand the allocation that is provided by the workload manager is utilized within the desirable range;

$Q^P$—the percentage of time intervals that deliver QoS satisfied demand, i.e. the percentage of time when the allocation provided by the workload manager is utilized within the desirable range;

$S^D$ the percentage of overall demand that is satisfied demand, i.e. for this portion of demand the allocation that is provided by the workload manager is able to satisfy the incoming demand; and $S^P$—the percentage of time intervals when the allocation provided by the workload manager is able to satisfy the incoming demand.

In certain embodiments, optimal values for one or more control parameter settings may be determined by the workload manager evaluator 12 in block 510. For example, by executing a simulation model of the workload manager (with its scheduling algorithm) over a given workload 13 and desirable range utilization of allocation (as may be specified by a system administrator as part of performance desires 17 shown in FIG. 1), the workload manager evaluator 12 of one embodiment can identify the optimal values for control parameters minCPU and maxCPU that support the metric(s) of interest (e.g., $Q^D$, $Q^P$, $S^D$, and $S^P$), while minimizing the CPU usage. Of course, the workload manager evaluator 12 may determine the optimal values for other control parameters of a scheduler. In certain embodiments, the workload manager may provide an evaluation of a workload manager other than specifying its optimal control parameter values, as described further below. For instance, in certain embodiment workload manager evaluator 12 may provide an evaluation that compares the performance of two or more workload managers (which may each have different control parameters values). Thus, embodiments of the present invention advantageously provide an evaluation metric for evaluating performance of workload managers in setting scheduler control parameters.

Figure 6:
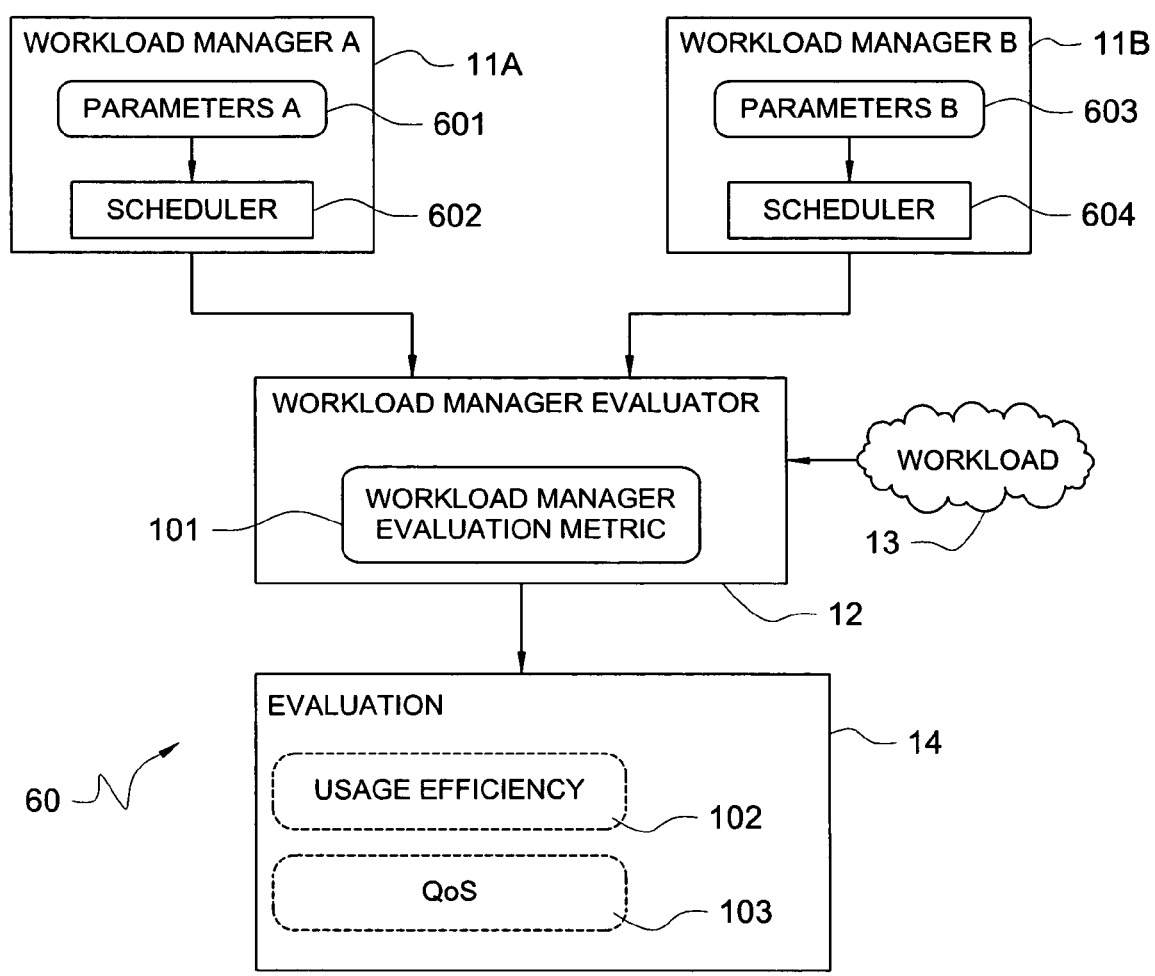
FIG. 6 shows an exemplary system in which a workload manager evaluator of an embodiment of the present invention utilizes evaluation metrics to compare the performance of two workload managers under a reference workload.

For example, in FIG. 6 an exemplary system 60 is shown in which workload manager evaluator 12 utilizes evaluation metrics 101 to compare the performance of workload managers 11A and 11B under workload 13. That is, workload managers 11A and 11B may be under evaluation for managing access of a system's representative (e.g., historical) workload 13 to shared resources, and workload manager evaluator 12 may use evaluation metrics 101 to determine which of the workload managers 11A and 11B performs better. In this example, workload manager 11A has a first set of control parameter values 601 that it defines for a scheduler 602, while workload manager 11B has a second set of control parameter values 603 that it defines for a scheduler 604. Workload manager evaluator 12 may utilize the above-described evaluation metrics 101 to evaluate whether workload manager 11A or workload manager 11B performs better under workload 13. As described above, these metrics reflect the quality of service provided by the workload managers and their respective resource usage. Thus, evaluation 14 may include an evaluation resource usage efficiency 102, workload QoS 103, and/or other performance criteria to determine which of the evaluated workload managers best satisfies some pre-defined performance desires, such as the performance desires 17 defined in FIG. 1. Of course, while two workload managers are shown in this example for ease of illustration, any number of workload managers may be so evaluated. Further, as described above, each of the workload managers may be evaluated using a simulation model of each respective workload manager under evaluation.

Figure 7:
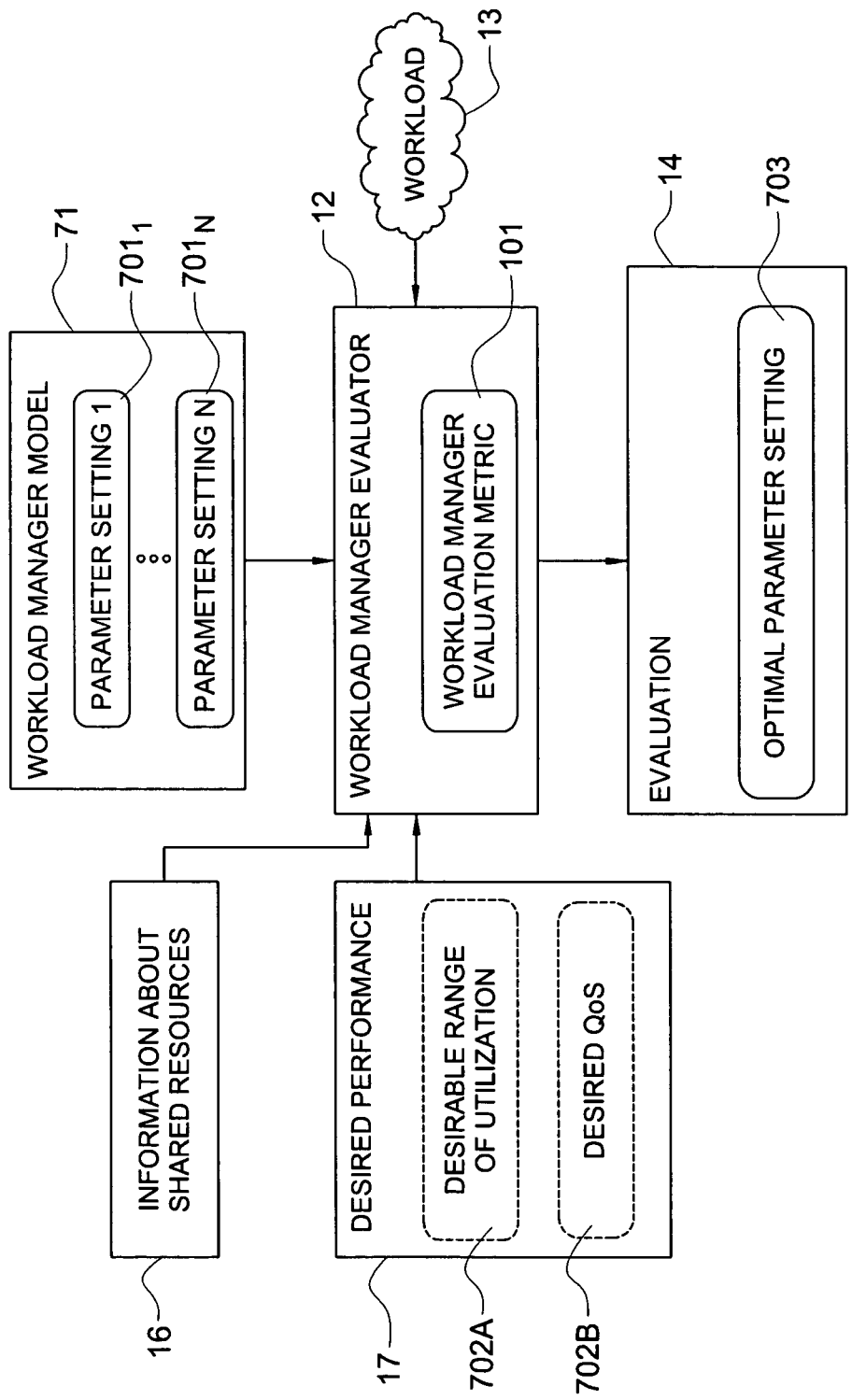
FIG. 7 shows another exemplary embodiment of a system in which a workload manager evaluator of an embodiment of the present invention utilizes evaluation metrics to evaluate various control parameter values and determine an optimal control parameter value for achieving a pre-defined desired performance under a reference workload.

FIG. 7 shows another exemplary embodiment of a system 70 in which workload manager evaluator 12 utilizes the above-described evaluation metrics 101 to evaluate various control parameter values and determine an optimal control parameter value for achieving a pre-defined desired performance under workload 13. In this example, a workload manager model 71 that may define a number of different control parameter values, shown as control parameter settings $701_1$-$701_N$, is evaluated. As described above, the control parameter settings defined by a workload manager may include such parameters as schedule interval, gain, minCPU allocation, maxCPU allocation, lowerAllocUtil threshold, and upperAl-locUtil threshold. Each of parameter settings $701_1$-$701_N$ has a different value assigned to one or more of the control parameters. In this example, workload manager evaluator 12 utilizes evaluation metrics 101 to evaluate the various parameter settings $701_1$-$701_N$ to determine an optimal set of control parameter values 703 as part of its evaluation 14. In this example, workload manager evaluator 12 receives information 16 about the capacity of the shared resources to which workloads in representative workload 13 are competing for access. Further, workload manager evaluator 12 receives desired performance 17, which includes information 702A specifying a desirable range of resource utilization and information 702B that specifies a desired workload QoS. Workload manager evaluator 12 may evaluate the metrics 101 computed for the various control parameter values $701_1$-$701_N$ to determine the optimal one of those values that best satisfies the defined desired performance characteristics 17. For example, a user may define values desired for certain parameters, such as lowerAllocUtil and upperAllocUtil thresholds, and the workload manager evaluator 12 may identify the optimal values for control parameters minCPU and maxCPU that provide sufficient support for satisfying the desired QoS 702B, while minimizing the CPU usage (to achieve the desired range of utilization 702A).

Figure 8:
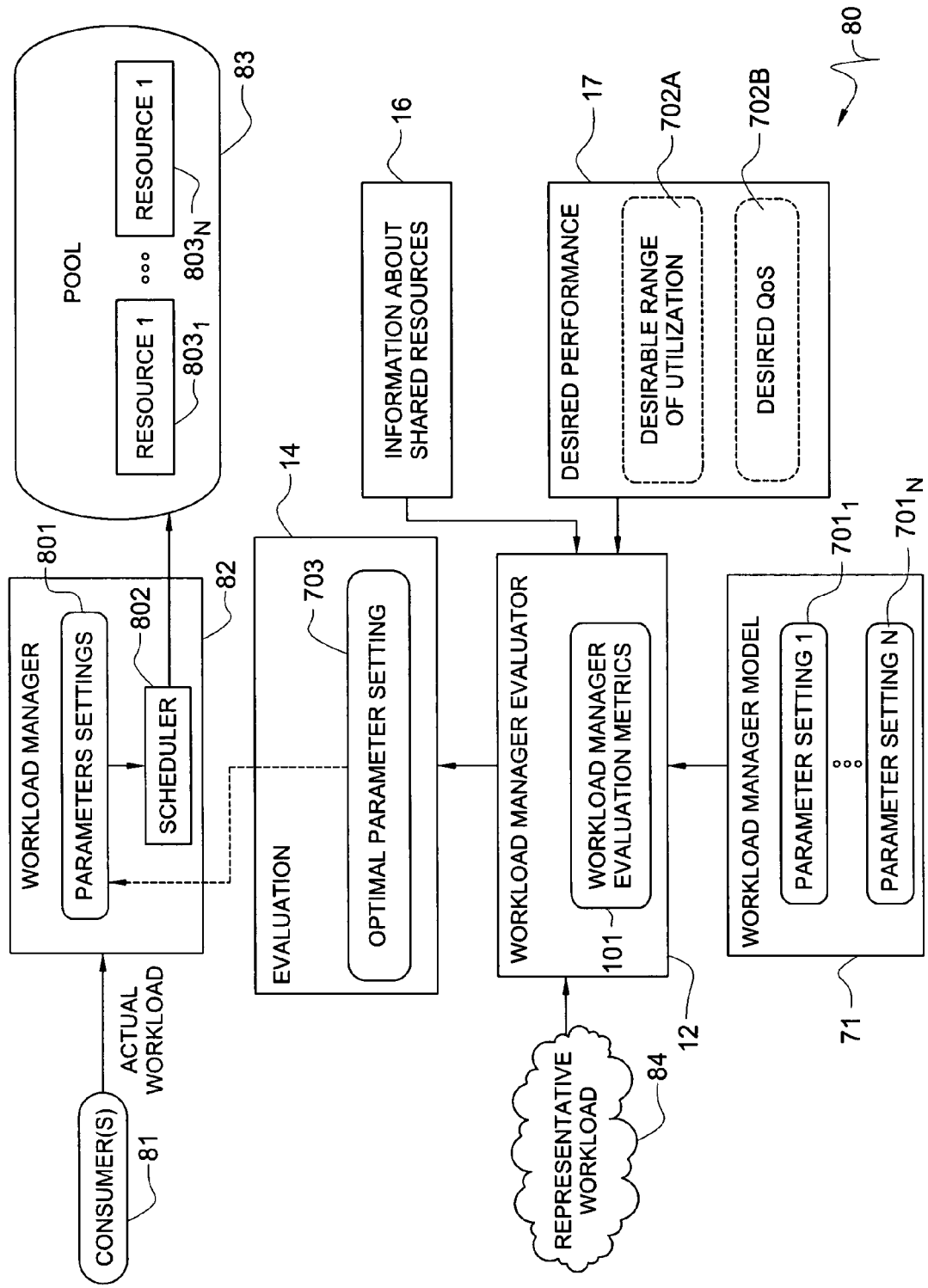
FIG. 8 shows an exemplary system that illustrates application of an evaluation of a workload manager's performance for improving the workload manager's performance according to one embodiment of the present invention.

Once the optimal control parameter values 703 are determined, those parameter values may be employed for the scheduler in an actual system. For instance, FIG. 8 shows an exemplary system 80 that illustrates application of an evaluation of a workload manager's performance for improving the workload manager's performance according to one embodiment of the present invention. In system 80, a workload manager 82 defines control parameters 801 for a scheduler 802 for managing access of consumer(s) 81 to shared resources, such as resources $803_1$-$803_N$ of resource pool 83. That is, workload manager 82 uses scheduler 802 for managing the access to shared resources by competing actual workloads of consumer(s) 82.

Additionally, as described above in FIG. 7, in this example, a workload manager model 71 models various parameter setting values $701_1$-$701_N$ that may be defined for scheduler 802 by workload manager 82. Workload manager evaluator 12 uses evaluation metrics 101 to determine the optimal parameter settings 703 under a representative workload 84 of consumer(s) 81 (e.g., a historical workload, etc.), in the manner described above with FIG. 7. Once determined, the optimal parameter settings 703 may be used by workload manager 82 as parameter settings 801 for scheduler 802. In certain embodiments, the actual workload of consumer(s) 81 over a given period of time (e.g., the past three month period) may be logged as representative workload 84, and workload manager evaluator 12 may periodically (e.g., once every three months) re-evaluate the performance of workload manager 82 such that optimal parameter settings 703 are updated if the actual workload changes over time.

Figure 9:
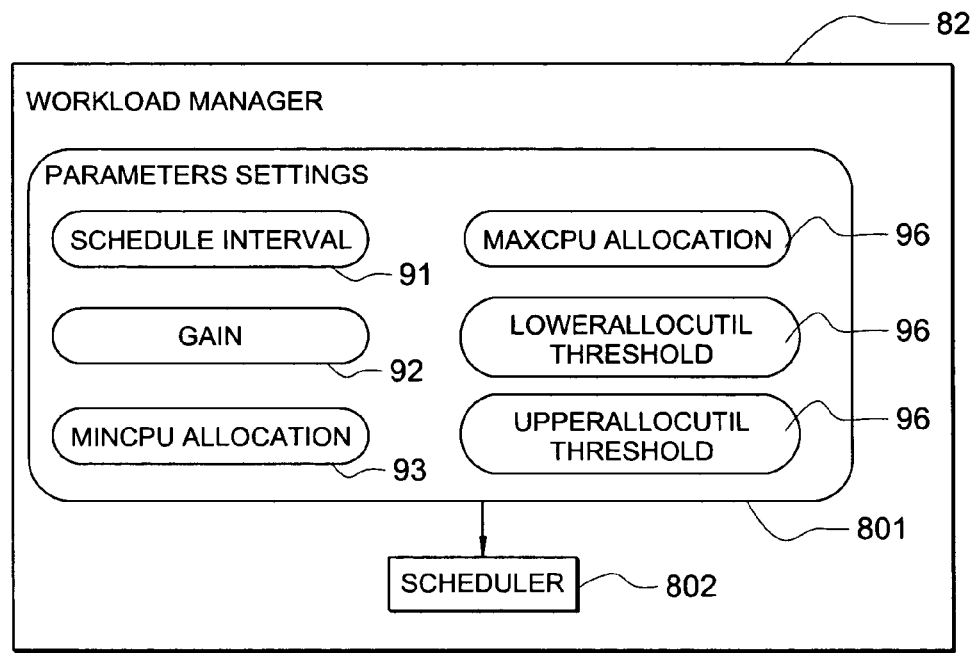
FIG. 9 shows an exemplary implementation of a workload manager, illustrating various control parameters that may be defined thereby for a scheduler according to one embodiment of the present invention.

FIG. 9 shows an exemplary implementation of workload manager 82 illustrating various control parameters 801 that may be defined for scheduler 802. As described above, the parameter settings may include schedule interval 91, gain 92, MinCPU Allocation 93, MaxCPU Allocation 94, LowerAllocUtil Threshold 95, and UpperAllocUtil Threshold 96. Workload manager evaluator 12 may determine the optimal value for one or more of these control parameter settings using the evaluation metrics 101 in the manner described above. For instance, various combinations of values for these control parameters may be evaluated to determine the combination of values that optimally achieves the performance desires 17. In certain embodiments, a user may specify desired values for certain ones of these parameters, such as lowerAllocUtil threshold 95 and upperAllocUtil threshold 96, and the values for the other parameters, such as gain 92, minCPU allocation 93, and maxCPU allocation 94, may be evaluated to determine optimal settings thereof. The minCPU allocation parameter is also referred to herein simply as "minCPU", and the maxCPU allocation parameter is also referred to herein simply as "maxCPU". Similarly, the lowerAllocUtil threshold parameter is also referred to herein simply as "lowerAllocUtil", and the upperAllocUtil threshold parameter is also referred to herein simply as "upperAllocUtil".

To illustrate an exemplary application of one embodiment using the above-described evaluation metrics 101, consider the following case study. The following case study is intended solely as an example and is not intended to limit the scope of the concepts presented herein. For this study, we obtained a trace of CPU demands for a file server from a software development environment that is to be hosted in a resource pool. This is the "reference system" for our case study. The trace was recorded over 140 days and includes a measurement of CPU utilization every 15 seconds. The file server had fixed access to 3 CPUs and was not governed by a workload manager.

Resource sharing will always have an impact on application QoS. In general, a system administrator aims to find a trade-off that provides acceptable application QoS and makes efficient use of resources, i.e., economically sound based on business need. As discussed further herein, embodiments of a workload manager evaluator 12 using evaluation metrics 101 may be used to evaluate performance under various control parameter values to determine the optimal values to utilize for achieving the desired trade-off (i.e., the desired performance 17).

For the above-mentioned exemplary case study, various workload manager control parameter settings for the file server workload and their impact on $Q^D$, U, $Q^P$ and $S^P$ are considered. Three workload quality of service scenarios are considered hereafter: high, medium, and low. These correspond to utilization of allocation ranges (lowerAllocUtil, upperAllocUtil) of (0.233, 0.433), (0.4, 0.6), and (0.566, 0.766), with mean utilization of allocation goals of 0.333, 0.5, and 0.666, respectively. Further, consider a QoS target for each of the services to be defined as $Q^D$=80%.

For each QoS scenario, the impact of different values for the gain, minCPU and maxCPU parameters on resource usage efficiency and resource access quality of service metrics is evaluated. First, the sensitivity to the gain and minCPU allocation parameters is considered. Gain is the parameter in the workload manager control algorithm that affects how quickly a workload's allocation increases or decreases based on its current demand. minCPU defines the minimum share of CPU that is always allocated to a workload independent of its CPU demand. Thus, at any point in time, the scheduler will allocate at least minCPU amount to the workload whether it needs CPU resources or not.

Figure 10:
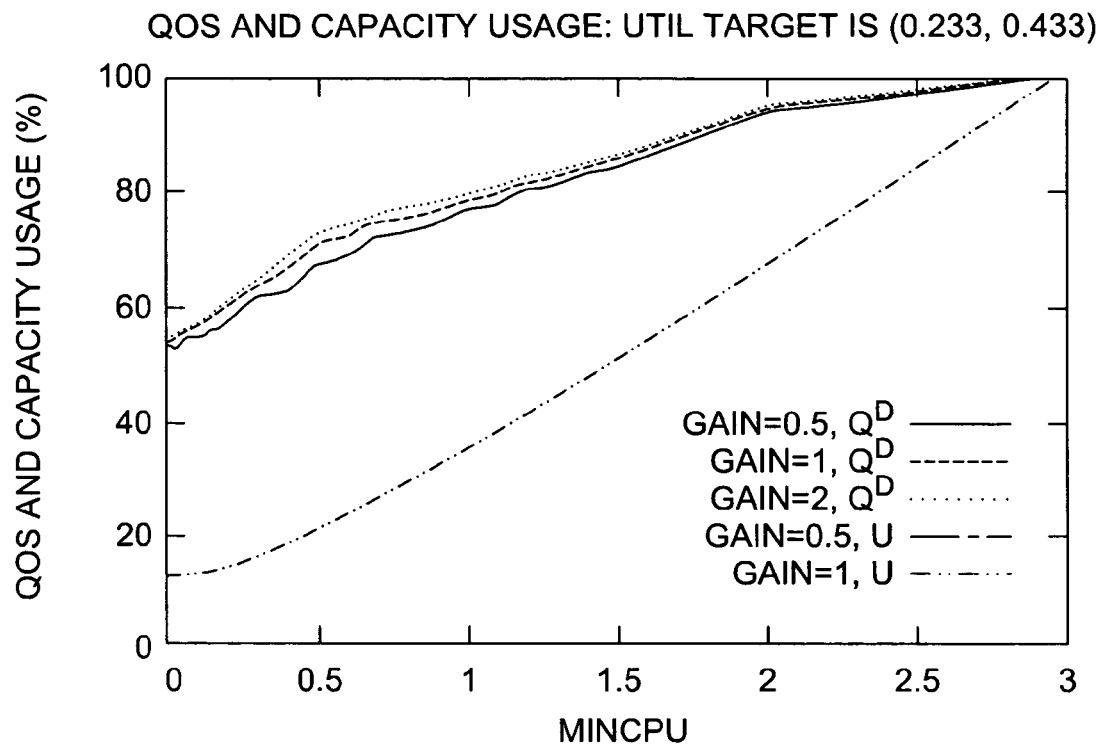
FIGS. 10-12 show graphs illustrating the relationship between the metrics "QoS satisfied demand" and "CPU capacity usage" with a plurality of different settings of a minCPU control parameter for high, medium, and low QoS target scenarios, respectively, for the exemplary case study.
Figure 11:
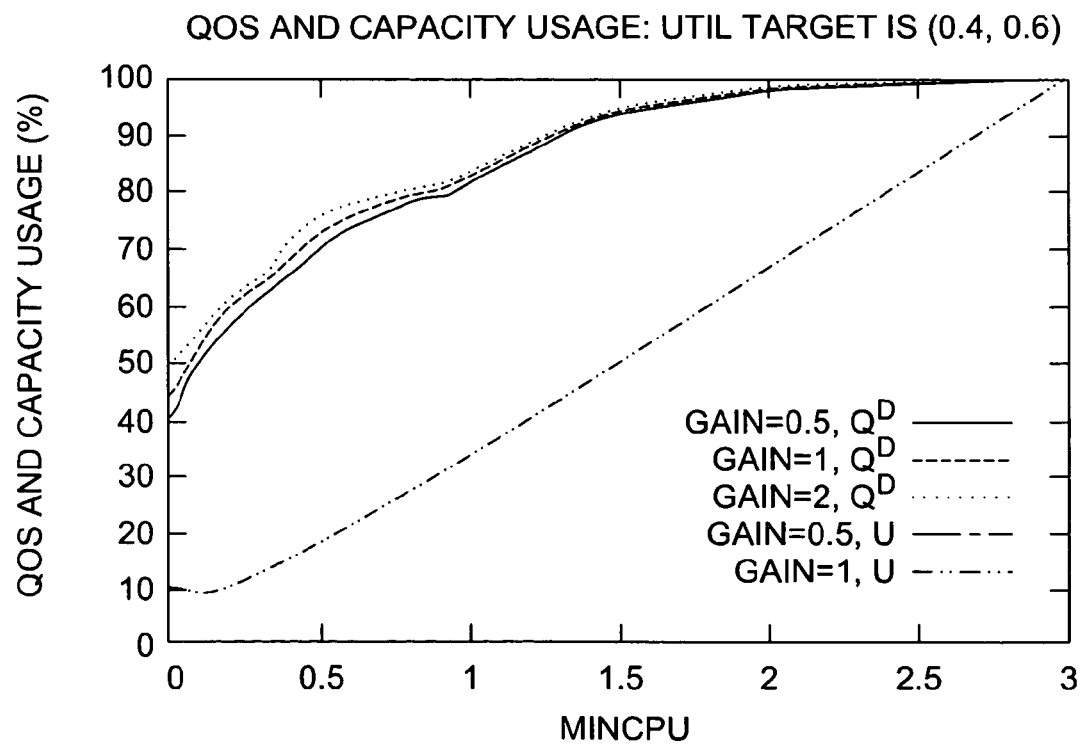
Figure 12:
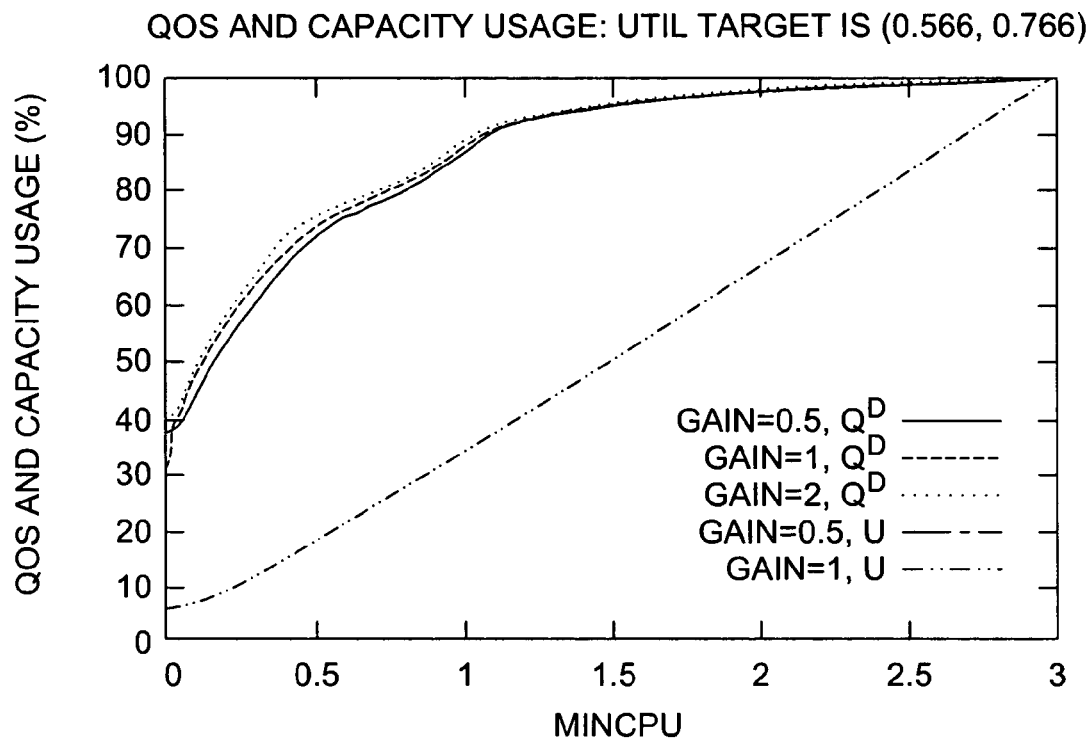

FIGS. 10-12 show the relationship between the metrics QoS satisfied demand $Q^D$ and CPU capacity usage U with the different settings of minCPU for the high, medium, and low QoS target scenarios, respectively, for the exemplary case study. Each of FIGS. 10-12 presents three $Q^D$ curves that correspond to values of gain=0.5, 1, and 2, respectively. Each of FIGS. 10-12 also includes three curves showing the capacity usage U for the corresponding values of gain.

FIG. 10 shows that gain has very little impact on capacity usage metric U in the exemplary case study. The U curves have values that are practically identical. The same is true for the medium and low QoS scenarios. The gain parameter does, however, have some impact on values of QoS satisfied demand $Q^D$. For lower minCPU levels, higher values for the gain parameter provide better values for $Q^D$. However, for higher values of QoS satisfied demand $Q^D$, e.g. 80%, higher values of minCPU are appropriate. For these higher minCPU values, the impact of the gain parameter on $Q^D$ is practically indistinguishable.

From the above evaluation of this exemplary case study, it may be concluded (e.g., by a workload manager evaluator 12) that a gain=1 is a reasonable choice for this workload, and thus such a value of gain=1 is used in the remaining analysis of this case study.

FIGS. 10-12 also show the relationship between high, medium, and low QoS scenarios with capacity usage U. When minCPU=1, capacity usage U is 35%, 33%, and 32%, respectively. This metric is informative that for this value of the minCPU parameter, the three scenarios have roughly the same CPU usage efficiency of underlying system capacity in the exemplary case study. This is somewhat counter-intuitive. One would expect the high QoS scenario to be much less efficient. From more detailed results, we found that the workload spent significant portions of time with its minCPU allocation and not in its targeted utilization range. As the value of minCPU parameter decreases, more time is spent in the targeted utilization range and so greater relative differences in U are observed with the high QoS scenario being less efficient than the lower QoS scenario.

Figure 13:
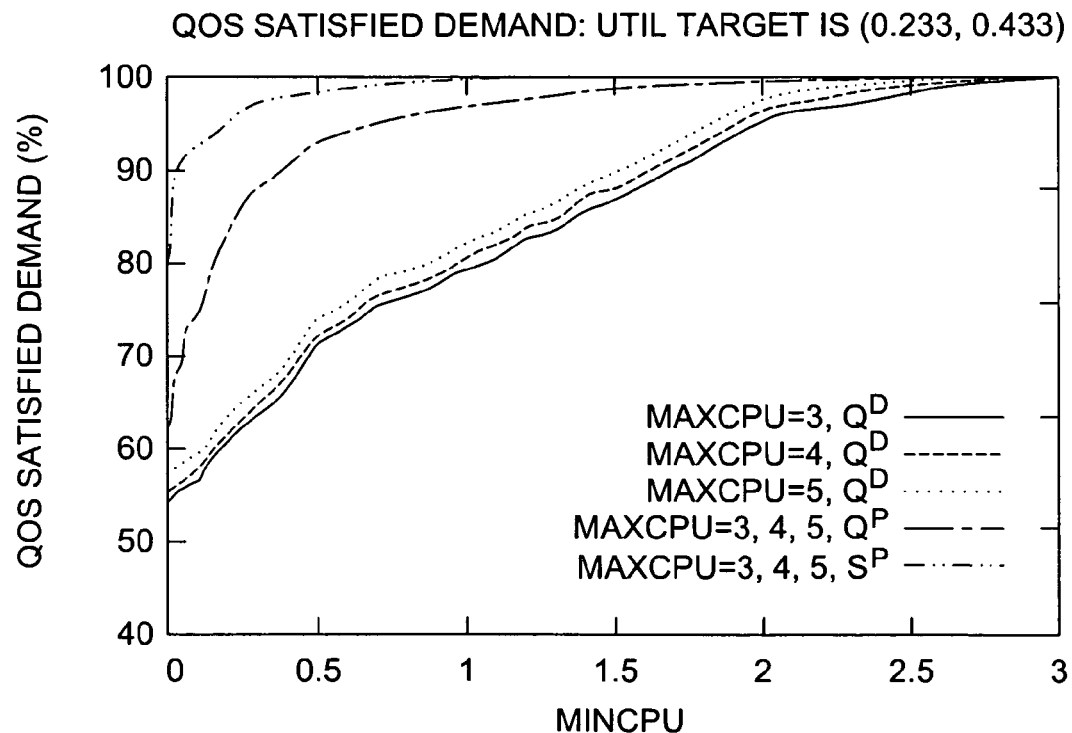
FIGS. 13-15 show graphs illustrating the minCPU control parameter versus $Q^D$, $Q^P$ and $S^P$ evaluation metrics for maxCPU=3, 4, and 5 for the high, medium, and low QoS scenarios, respectively, for the exemplary case study.
Figure 14:
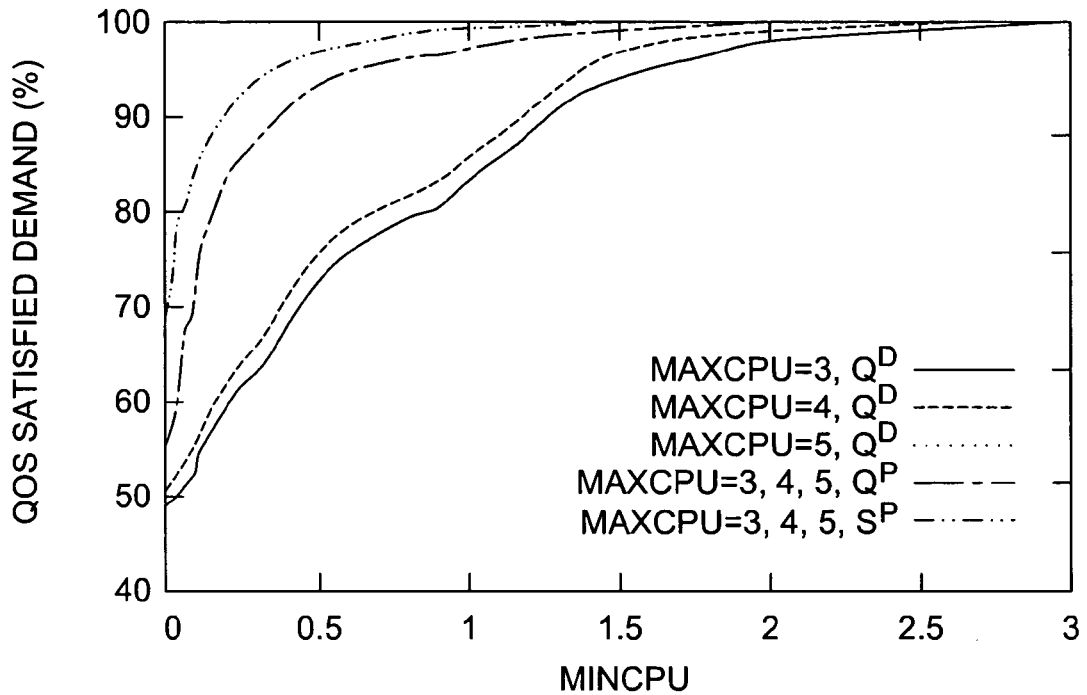
Figure 15:
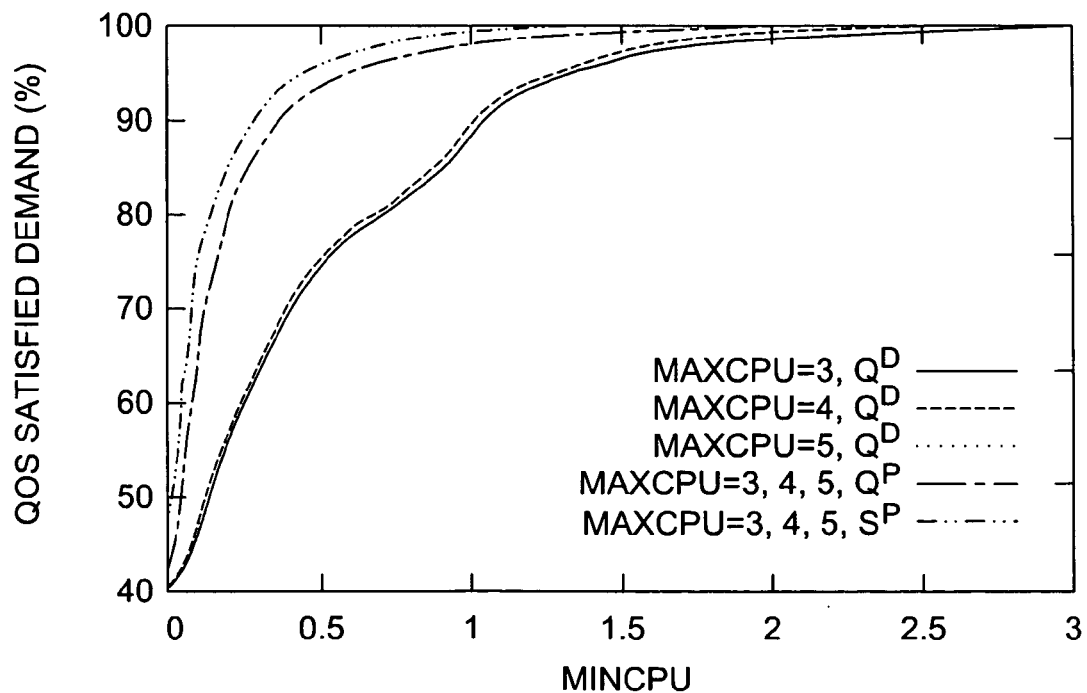

Next, the minCPU and maxCPU parameters versus $Q^D$, $Q^P$ and $S^P$ evaluation metrics are considered. The impact of minCPU and maxCPU parameters in the workload manager controller algorithm on the evaluation metrics $Q^D$ (percentage of QoS satisfied demand), $Q^P$ (percentage of time intervals with QoS satisfied demand), and $S^P$ (percentage of time intervals with satisfied demand) is observed. FIGS. 13-15 illustrate these metrics for maxCPU=3, 4, and 5 for the high, medium, and low QoS scenarios, respectively.

Considering FIG. 13, the x-axis shows the minCPU value that achieves a particular $Q^D$ value on the y-axis. Several curves are shown. Three of the curves, that correspond to different values of maxCPU=3, 4, and 5, show the relationship between the minCPU parameter setting and achievable QoS satisfied demand metric $Q^D$ for the exemplary case study. Two curves show the relationship between the minCPU parameter and $Q^P$ and $S^P$ metrics for values of maxCPU=3, 4, and 5. Since the values for $Q^P$ and $S^P$ are nearly identical for each of the maxCPU=3, 4, and 5 cases, respectively, only one curve is shown for all three considered values.

FIGS. 10-12 show the relationship between $Q^D$, its corresponding value for minCPU, and its corresponding value for capacity usage U for the high, medium, and low QoS scenarios, respectively. The capacity usage curves are the most bottom curves in FIGS. 10-12. The U values are practically identical for the different values of the gain parameter. As mentioned above, a value of gain=1 is considered here. From FIGS. 10-12, $Q^D$=80% corresponds to U=35%, 25%, and 20% for the high, medium and low QoS scenarios, respectively. As expected, the low QoS scenario makes the most efficient use of resources. Also as expected, from FIGS. 13-15, it can be seen that the $Q^P$ and $S^P$ values diminish as the QoS shifts from a high to low QoS.

Finally, to achieve a $Q^D$=80% for the high QoS scenario with maxCPU=3, 4, or 5, the workload manager controller must be configured with a minCPU=1.1, 1.0, 0.9 CPUs, respectively, in this exemplary case study. While these are lower CPU requirements than a fixed allocation of 3 CPUs, i.e., as in the reference case, we can determine whether its possible to do better. The sum of minCPU values over all resource containers must be less than the capacity of the resource pool. Large minCPU values may present an unintended limit on the number of workloads that can be associated with a shared resource pool whether or not the pool is heavily utilized.

Figure 16:
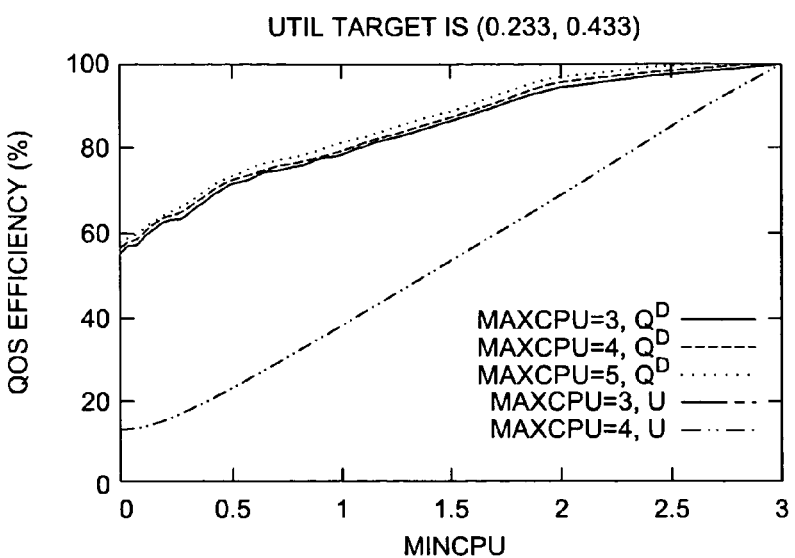
FIGS. 16-18 show graphs illustrating the $Q^D$ metric for a given workload in this exemplary case study with respect to different values of minCPU and maxCPU parameters for high, medium, and low workload QoS scenarios, respectively, for the exemplary case study.
Figure 17:
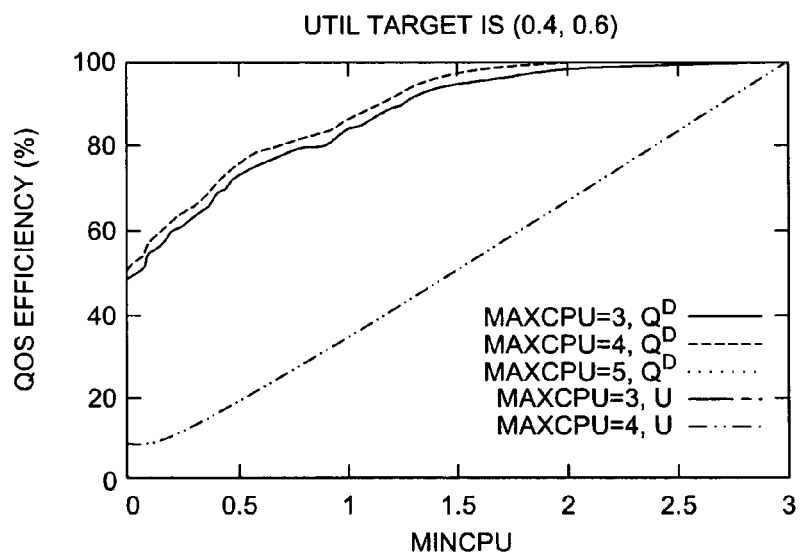
Figure 18:
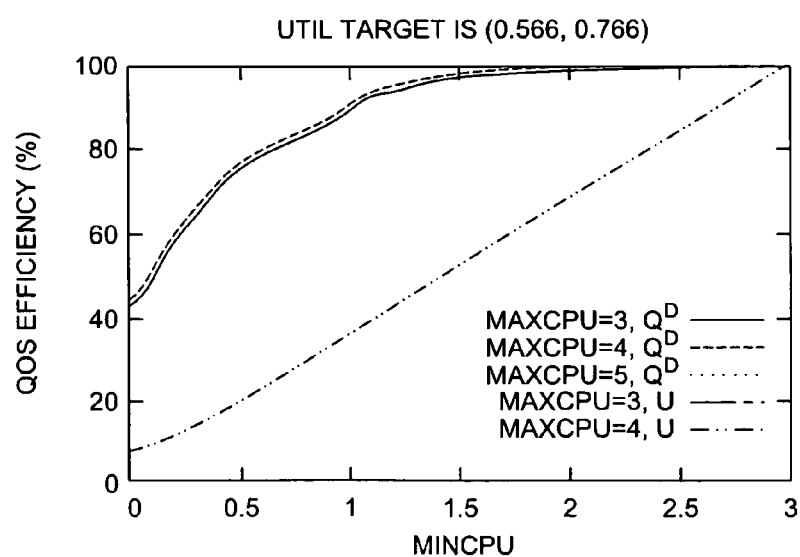

FIGS. 16-18 show the $Q^D$ metric for a given workload in this exemplary case study with respect to different values of minCPU and maxCPU parameters (in this example maxCPU is limited to less than or equal to 5) for high, medium, and low workload quality of service scenarios, respectively. That is, FIG. 16 shows the impact of the minCPU and maxCPU parameters for a high QoS scenario in which the resource utilization of allocation range (lowerAllocUtil, upperAllocUtil) is (0.233, 0.433). FIG. 17 shows the impact of the minCPU and maxCPU parameters for a medium QoS scenario in which the resource utilization of allocation range (lowerAllocUtil, UpperAllocUtil) is (0.4, 0.6). And, FIG. 18 shows the impact of the minCPU and maxCPU parameters for a low QoS scenario in which the resource utilization of allocation range (lowerAllocUtil, upperAllocUtil) is (0.566, 0.766). FIGS. 16-18 also illustrate lines reflecting the usage efficiency metric U.

As can be determined from the evaluation illustrated in FIGS. 13-18, in order to support $Q^D$=80% while minimizing CPU usage, the optimal parameter settings in this exemplary case study are:

a) for high QoS service: minCPU=0.9 and maxCPU=5;

b) for medium QoS service: minCPU=0.65 and maxCPU=4; and c) for low QoS service: minCPU=0.65 and maxCPU=4.

The above-described exemplary case study illustrates one example of how the evaluation metrics may be utilized to evaluate the performance of a workload manager (i.e., to evaluate various control parameter settings for given system under a reference workload). For instance, the above exemplary case study provides a concrete example of how the above-described evaluation metrics 101 may be used to determine minCPU and maxCPU control parameter settings for a scheduler under a reference workload.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 19:
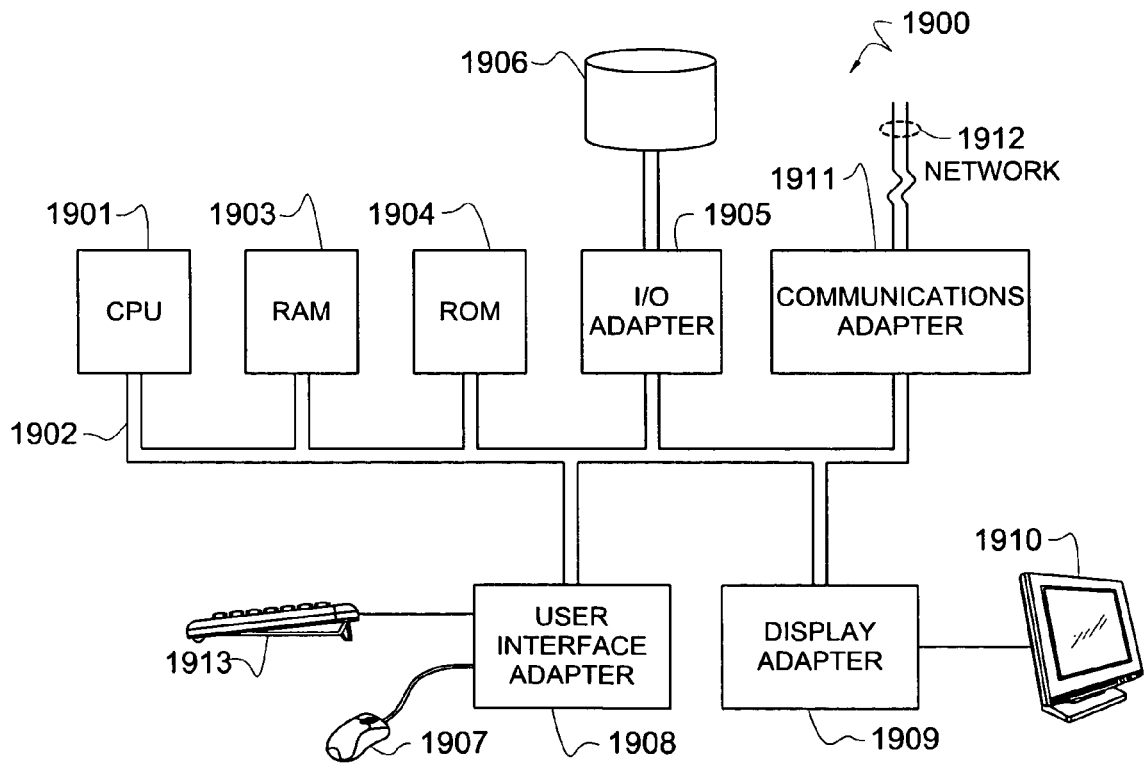
FIG. 19 shows an exemplary system on which the workload manager evaluator may be implemented according to one embodiment of the present invention.

FIG. 19 illustrates an exemplary computer system 1900 on which the workload manager evaluator 12 may be implemented according to one embodiment of the present invention. Central processing unit (CPU) 1901 is coupled to system bus 1902. CPU 1901 may be any general-purpose CPU. The present invention is not restricted by the architecture of CPU 1901 (or other components of exemplary system 1900) as long as CPU 1901 (and other components of system 1900) supports the inventive operations as described herein. CPU 1901 may execute the various logical instructions according to embodiments of the present invention. For example, CPU 1901 may execute machine-level instructions according to the exemplary operational flows described above in conjunction with FIGS. 2 and 5.

Computer system 1900 also preferably includes random access memory (RAM) 1903, which may be SRAM, DRAM, SDRAM, or the like. Computer system 1900 preferably includes read-only memory (ROM) 1904 which may be PROM, EPROM, EEPROM, or the like. RAM 1903 and ROM 1904 hold user and system data and programs, as is well known in the art.

Computer system 1900 also preferably includes input/output (I/O) adapter 1905, communications adapter 1911, user interface adapter 1908, and display adapter 1909. I/O adapter 1905, user interface adapter 1908, and/or communications adapter 1911 may, in certain embodiments, enable a user to interact with computer system 1900 in order to input information, such as information 16 and/or 17 of FIG. 1.

I/O adapter 1905 preferably connects to storage device(s) 1906, such as one or more of hard drive, compact disc (CD) drive, floppy disk-drive, tape drive, etc. to computer system 1900. The storage devices may be utilized when RAM 1903 is insufficient for the memory requirements associated with storing data for operations of the workload manager evaluator 12 (e.g., representative workload 13, shared resource information 16, performance desires 17, and/or other information used in evaluating performance of a workload manager as described above). Communications adapter 1911 is preferably adapted to couple computer system 1900 to network 1912, which may enable information to be input to and/or output from system 1900 via such network 1912 (e.g., the Internet or other wide-area network, a local-area network, a public or private switched telephony network, a wireless network, any combination of the foregoing). For instance, a representative workload 13 may be input to system 1900 via network 1912 from a remote computer, and a determined optimal control parameter value(s) computed by the workload manager evaluator 12 may be output and communicated via network 1912 to a workload manager for use in controlling a corresponding scheduler, such as described above with FIG. 8. User interface adapter 1908 couples user input devices, such as keyboard 1913, pointing device 1907, and microphone 1914 and/or output devices, such as speaker(s) 1915 to computer system 1900. Display adapter 1909 is driven by CPU 1901 to control the display on display device 1910 to, for example, display information regarding the determined evaluation 14 of a workload manager under evaluation according to certain embodiments of the present invention.

It shall be appreciated that the present invention is not limited to the architecture of system 1900. For example, any suitable processor-based device may be utilized for implementing workload manager evaluator 12, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

What is claimed is:

1. A system for evaluating the performance of a workload manager comprising:

a processor to execute stored instructions; and a memory device that stores instructions, the memory device comprising computer-executable for:

a workload manager evaluator to receive a representative workload that is representative of competing workloads that share access to at least one shared computing resource;

said workload manager evaluator:

to evaluate performance of a scheduler that schedules access of the competing workloads to the shared computing resource according to defined control parameter values, wherein said workload manager evaluator evaluates performance of the scheduler under the representative workload based on an evaluation of a quality of service to the representative workload and usage efficiency of the shared computing resource for a plurality of different sets of values for minCPU allocation and maxCPU allocation control parameters; and to identify and select based on evaluation ones of the plurality of different values for the minCPU allocation and maxCPU allocation control parameters that provide a desired quality of service to the representative workload while minimizing usage of the at least one shared computing resource as the control parameter for the scheduler.

2. The system of claim 1 comprising a non-transitory computer readable medium that stores computer executable code directed toward the workload manager evaluator.

3. The system of claim 1 wherein said workload manager evaluator evaluates performance of the scheduler under the representative workload for a plurality of different sets of values of the control parameters.

4. The system of claim 1 wherein the workload manager evaluator determines an optimal one of the plurality of different sets of control parameter values that provides a desired level of quality of service to the representative workload while minimizing usage of the shared computing resource.

5. The system of claim 1 wherein the at least one set of values of the control parameters comprise values set by a workload manager.

6. The system of claim 1 further comprising:
the at least one shared computing resource; and
the scheduler.

7. The system of claim 1 wherein the control parameters comprise at least one of the following:
a schedule interval control parameter that specifies a period at the end of which a workload manager computes a new schedule for the scheduler;
a gain control parameter that affects how quickly a workload's allocation increases or decreases based on the workload's current demand;
a minCPU allocation control parameter that defines a minimum CPU allocation amount for a workload;
a maxCPU allocation control parameter that defines a maximum CPU allocation amount for the workload;
a lowerAllocUtil threshold control parameter that triggers a decrease of the allocation; and
a upperAllocUtil threshold control parameter that triggers an increase of the allocation.

8. The system of claim 7 wherein a user defines values for the lowerAllocUtil threshold and the upperAllocUtil threshold, and wherein the workload manager evaluator evaluates a plurality of different values for at least the minCPU allocation and maxCPU allocation control parameters.

9. The system of claim 1 wherein a user defines desired performance parameters, and wherein the workload manager evaluator evaluates performance for a plurality of different values for control parameters.

10. The system of claim 9 wherein the workload manager evaluator selects the ones of the plurality of different values for control parameters that satisfy desired quality of service to the representative workload with minimum usage of the shared computing resource.

11. A non-transitory computer-readable medium comprising computer-executable software code, the computer-executable software code comprising:

code for receiving a representative workload that comprises a plurality of competing workloads demanding access to at least one shared resource;

code for evaluating performance of a scheduler in scheduling access to the at least one shared resource under the representative workload based on an evaluation of a quality of service to the representative workload and usage efficiency of the shared computing resource for a plurality of different sets of values for a minCPU allocation and a maxCPU allocation control parameters to identify ones of the plurality of different values for the minCPU allocation and maxCPU allocation control parameters that provide a desired quality of service to the representative workload while minimizing usage of the at least one shared computing resource as the control parameter for the scheduler; and code for determining and selecting based on said evaluating an optimal value of the plurality of different values for the control parameter of the scheduler for scheduling access to the at least one shared resource for the representative workload to satisfy defined performance desires of the system.

12. The non-transitory computer-readable medium of claim 11 further comprising:
code for receiving user-defined values for
a) a lowerAllocUtil threshold control parameter that triggers a decrease of CPU allocation to a workload, and
b) a upperAllocUtil threshold control parameter that triggers an increase of the allocation; and
wherein said code for determining an optimal value of the plurality of different values for the at least one control parameter, comprises code for determining an optimal value for
a) a minCPU allocation control parameter that defines a minimum CPU allocation amount for a workload; and
b) a maxCPU allocation control parameter that defines a maximum CPU allocation amount for the workload.

13. A method for evaluating the performance of a workload manager comprising:
receiving, by a workload manager evaluator, a representative workload demanding access to at least one shared resource;
receiving, by the workload manager evaluator, a user-defined value for at least one desired performance parameter; and
evaluating, by the workload manager evaluator, performance of at least one workload manager in setting values for at least one control parameter of a scheduler for managing access to the at least one shared resource, wherein said workload manager evaluator evaluates performance of the scheduler under the representative workload based on an evaluation of a quality of service to the representative workload and usage efficiency of the shared computing resource for a plurality of different sets of values for minCPU allocation and maxCPU allocation control parameters to identify and select ones of the plurality of different values for the minCPU allocation and maxCPU allocation control parameters that provide a desired quality of service to the representative workload while minimizing usage of the at least one shared computing resource as the control parameter for the scheduler.

14. The method of claim 13 wherein the at least one shared resource comprises at least one central processing unit (CPU), and wherein at least one desired performance parameter comprises at least one of the following:
 a) a lowerAllocUtil threshold control parameter that triggers a decrease of CPU allocation for the workload, and
 b) a upperAllocUtil threshold control parameter that triggers an increase of the CPU allocation for the workload; and
wherein the at least one control parameter of a scheduler comprises at least one of the following:
 a) a minCPU allocation control parameter that defines a minimum CPU allocation amount for the workload; and
 b) a maxCPU allocation control parameter that defines a maximum CPU allocation amount for the workload.

15. The method of claim 13 wherein the evaluating comprises:
 evaluating a plurality of different values for the minCPU allocation and maxCPU allocation control parameters to identify ones of the plurality of different values for the minCPU allocation and maxCPU allocation control parameters that provide desired quality of service to the workload while minimizing usage of the at least one CPU.

16. The method of claim 13 wherein the evaluating comprises:
 evaluating, by the workload manager evaluator, performance of a plurality of workload managers based on quality of service to the workload and usage efficiency of the shared resource.

17. The method of claim 13 wherein the evaluating comprises:
 computing usage efficiency "U" as follows:

$$U = \frac{\left(\sum_{i=1}^{i=T} A_i\right)/T}{A_{ref}},$$

wherein the workload comprises resource access demands for intervals i=1,...,T, wherein $A_i$ is the allocation of the shared resource for interval i, and wherein $A_{ref}$ represents a fixed allocation of a reference system.

18. The method of claim 13 wherein the evaluating comprises:
 computing resource access quality of service (QoS) using metric QoS satisfied demand "$D^{QoS}$" as follows:

$$D^{QoS} = \sum_{i=1}^{i=T} D_i, \text{ such that } \frac{D_i}{A_i} \le upperAllocUtil,$$

wherein the workload comprises resource access demands for intervals i=1,...,T, wherein $D_i$ represents demand for access to the shared resource for interval i, wherein $A_i$ is the allocation of the shared resource for interval i, and wherein upperAllocUtil is a scheduler control parameter that triggers an increase of the allocation.

19. The method of claim 13 wherein said evaluating comprises computing at least one of the following metrics:
 a) $Q^D$ defining a percentage of overall demand of the workload for which sufficient access to the shared resource is allocated by the scheduler to be within a desired quality of service range;
 b) $Q^P$ defining percentage of time intervals in the workload for which the allocation of access to the shared resource provided by the scheduler is utilized within a desired resource usage range;
 c) $S^D$ defining a percentage of overall demand of the workload that is allocated sufficient access to the shared resource to be satisfied; and
 d) $S^P$ defining a percentage of time intervals in the workload for which the allocation of access to the shared resource provided by the scheduler is sufficient to satisfy demand.

\* \* \* \* \*